(12) United States Patent
Uesugi et al.

(10) Patent No.: US 11,943,535 B2
(45) Date of Patent: Mar. 26, 2024

(54) IMAGE STABILIZATION CONTROL DEVICE AND STORAGE MEDIUM

(71) Applicant: CANON KABUSHIKI KAISHA, Tokyo (JP)

(72) Inventors: Tomomi Uesugi, Kanagawa (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/881,821

(22) Filed: Aug. 5, 2022

(65) Prior Publication Data

US 2023/0055150 A1 Feb. 23, 2023

(30) Foreign Application Priority Data

Aug. 17, 2021 (JP) .................................. 2021-133021

(51) Int. Cl.
*H04N 23/68* (2023.01)

(52) U.S. Cl.
CPC ....... *H04N 23/6812* (2023.01); *H04N 23/683* (2023.01); *H04N 23/685* (2023.01)

(58) Field of Classification Search
CPC . H04N 23/685; H04N 23/6812; H04N 23/683
See application file for complete search history.

(56) References Cited

U.S. PATENT DOCUMENTS

| 9,277,102 B2 | 3/2016 | Kimura et al. |
| 9,294,677 B2 | 3/2016 | Washisu et al. |
| 2013/0004151 A1* | 1/2013 | Wakamatsu ............. G03B 5/02 396/55 |

FOREIGN PATENT DOCUMENTS

| JP | 2010-025961 A | 2/2010 |
| JP | 2013-118450 A | 6/2013 |

* cited by examiner

*Primary Examiner* — Minh Q Phan

(74) *Attorney, Agent, or Firm* — Cowan, Liebowitz & Latman, P.C.

(57) ABSTRACT

An image stabilization control device capable of correcting a parallel blur or the like with high accuracy, the image stabilization control device including: a rotation radius calculation unit configured to calculate a rotation radius of an angle blur based on outputs of an angle blur signal acquired from an angle blur detection unit and a parallel blur signal acquired from a parallel blur detection unit; a rotation radius prediction unit configured to predict a change in the rotation radius based on an output of the rotation radius calculation unit and output a rotation radius prediction signal; and a blur correction control unit configured to control correction of the parallel blur based on the rotation radius prediction signal of the rotation radius prediction unit and the angle blur signal acquired from the angle blur detection unit.

17 Claims, 19 Drawing Sheets

IMAGE STABILIZATION CONTROL DEVICE AND STORAGE MEDIUM

BACKGROUND OF THE INVENTION

Field of the Invention

The present invention relates to an image stabilization control device correcting a parallel blur and the like and a storage medium.

Description of the Related Art

In the related art, as disclosed in Japanese Patent Laid-Open No. 2010-25961, there is a method of alleviating deterioration in an image due to a parallel blur.

According to Japanese Unexamined Patent Publication No. 2010-25961, since blur correction during exposure is performed based on blur information before the exposure, blur correction accuracy cannot be improved. As a measure to be taken, as disclosed in Japanese Unexamined Patent Publication No. 2013-118450, there is a technology for predicting a blur during exposure. However, a problem may arise in that a waveform of a parallel blur has many frequencies and prediction accuracy cannot be improved.

An objective of the present invention is to provide an image stabilization control device capable of correcting a parallel blur or the like with high accuracy.

SUMMARY OF THE INVENTION

To achieve the foregoing objective, according to an aspect of the present invention, an image stabilization control device includes at least one processor or circuit configured to function as: a rotation radius calculation unit configured to calculate a rotation radius of an angle blur based on outputs of an angle blur signal acquired from an angle blur detection unit and a parallel blur signal acquired from a parallel blur detection unit; a rotation radius prediction unit configured to predict a change in the rotation radius based on an output of the rotation radius calculation unit and output a rotation radius prediction signal; and a blur correction control unit configured to control correction of the parallel blur based on the rotation radius prediction signal of the rotation radius prediction unit and the angle blur signal acquired from the angle blur detection unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

In the embodiments, an example in which a digital still camera is applied as an image stabilization control device will be described. The image stabilization control device can be applied to a digital movie camera, a smartphone with a camera, a tablet computer with a camera, an in-vehicle camera, a drone camera, a camera mounted on a robot, an electronic device that has an imaging function of a network camera or the like, or the like.

First Embodiment

Figure 1:
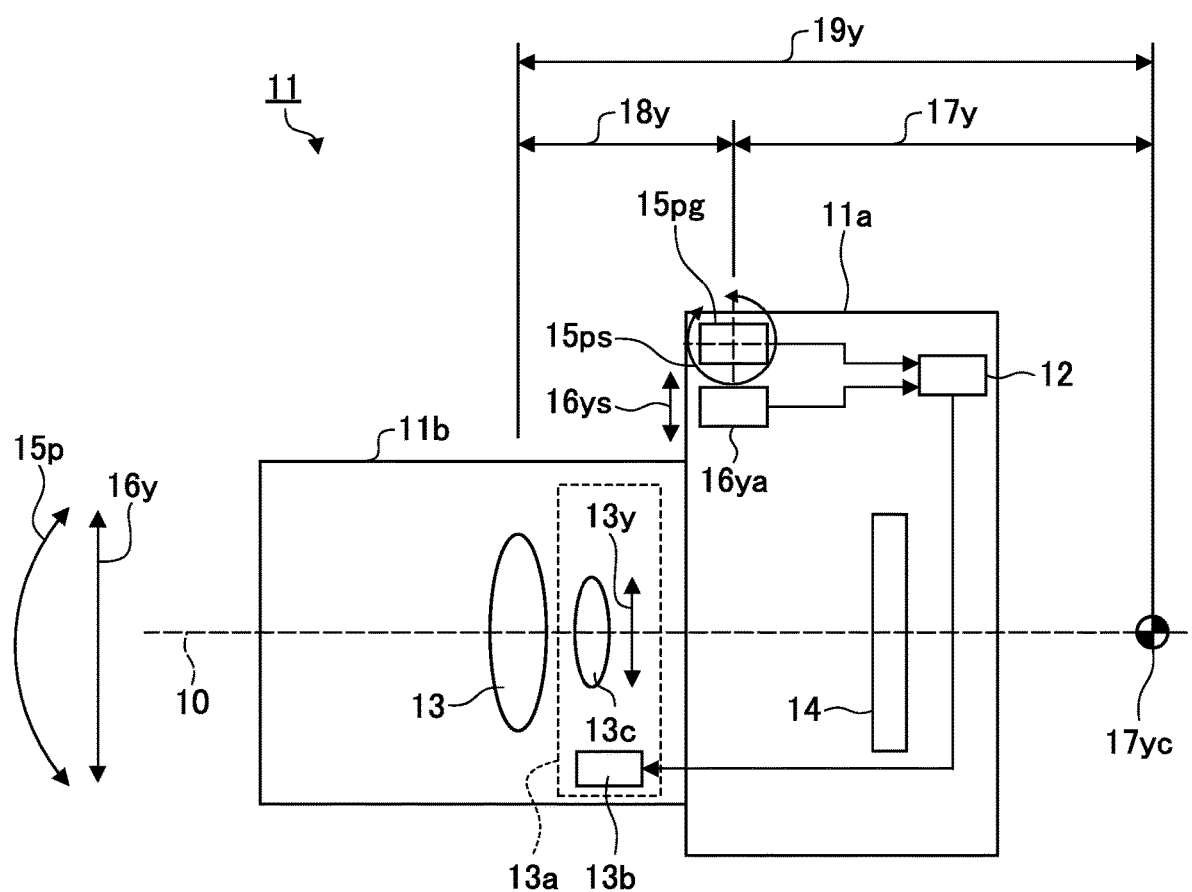
FIG. 1 is a side view illustrating a camera according to a first embodiment of the present invention.

A configuration or the like of a camera according to a first embodiment will be described with reference to FIGS. 1 to 11. FIG. 1 is a side view illustrating a camera according to the first embodiment of the present invention and illustrates a configuration of an image stabilization control device in a (digital still) camera 11 that includes a camera body 11a and an interchangeable lens unit 11b that is detachably mounted on the camera body 11a.

A CPU 12 provided in the camera body 11a in FIG. 1 controls an imaging operation or an image stabilization operation in the camera in response to an imaging instruction manipulation or the like from a photographer. The CPU 12 functions as a control unit that controls an operation of each unit of the entire device, including a blur correction operation based on a computer program stored in a memory serving as a storage medium.

A subject light flux along an optical axis 10 is incident on an image sensor 14 serving as an imaging unit through an imaging optical system 13 provided in the interchangeable lens unit 11b. The image sensor 14 is configured with a CMOS image sensor or the like and outputs an image signal in response to the input subject light flux. In FIG. 1, the vertical direction of FIG. 1 is referred to as a longitudinal direction of the camera.

In FIG. 1, reference numeral 15pg denotes a first angular velocimeter that serves as an angle blur detection unit and detects a blur angular velocity in a pitch direction indicated by an arrow 15ps applied to the camera 11. An angle blur signal from the first angular velocimeter 15pg is input to the CPU 12. Reference numeral 16ya denotes a first accelerometer that serves as a parallel blur detection unit and detects a blur acceleration in the longitudinal direction of the camera indicated by an arrow 16ys applied to the camera 11. An acceleration signal from the first accelerometer 16ya is input to the CPU 12.

In the present embodiment, an example in which the camera body 11a includes an angle blur detection unit (the first angular velocimeter 15pg) and a parallel blur detection unit (the first accelerometer 16ya) will be described. When signals indicating detection results can be acquired from the detection units, the camera body 11a may not include the detection units. For example, the lens unit 11b may include one or both of the angle blur detection unit and the parallel blur detection unit and the camera body 11a may acquire such information through communication with the lens unit.

Reference numeral 13c denotes a blur correction lens that is driven in the direction of an arrow 13y by a driving unit 13b and corrects an angle blur. Here, a blur correction control unit includes the blur correction lens 13c and the driving unit 13b.

Figure 2:
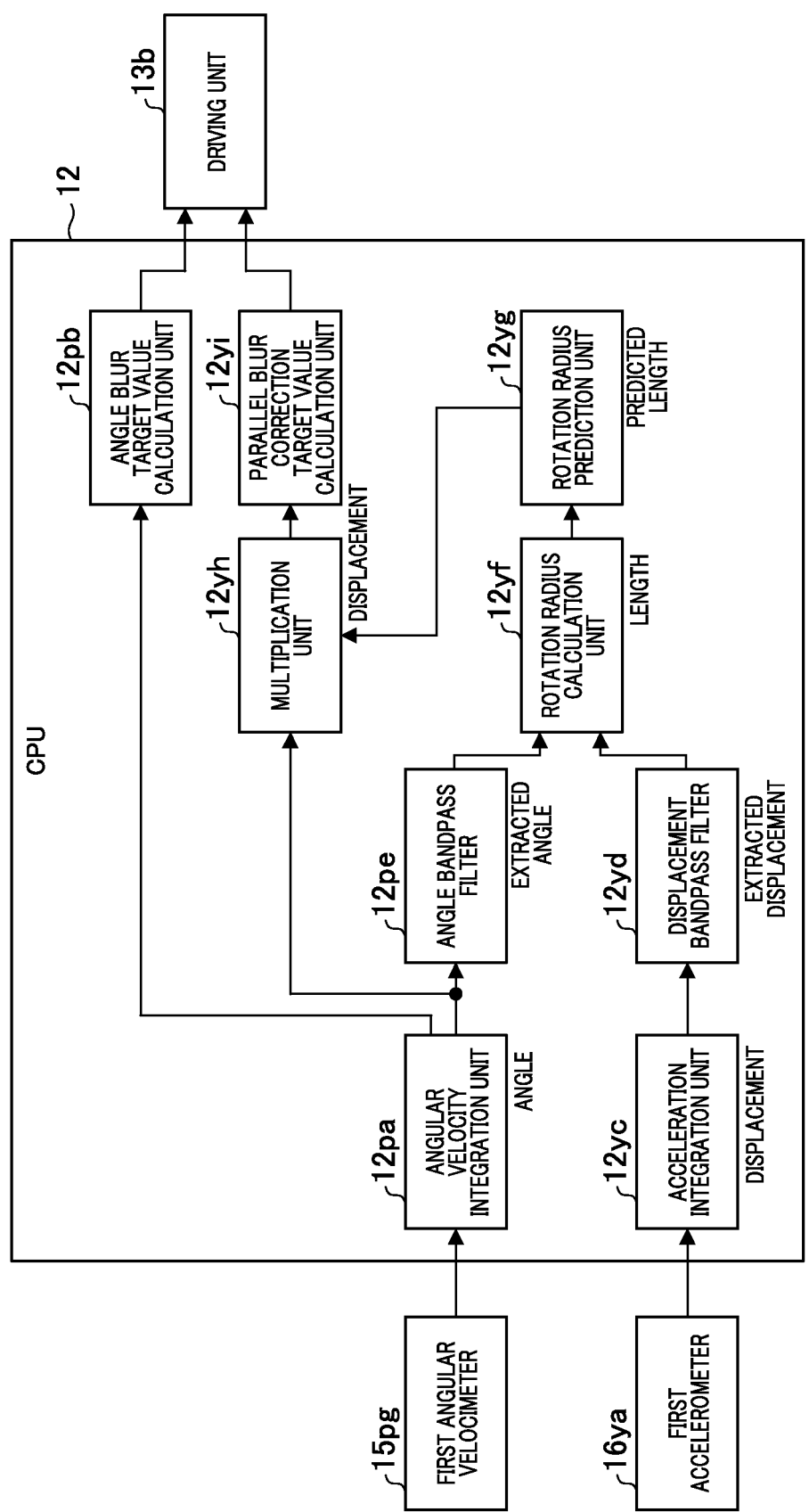
FIG. 2 is a functional block diagram illustrating main units of an image stabilization control device in a longitudinal direction of the camera in FIG. 1.

FIG. 2 is a functional block diagram illustrating main units of the image stabilization control device in the longitudinal direction of the camera in FIG. 1. Some of the functional blocks illustrated in FIG. 2 are implemented by causing the CPU 12 serving as a computer included in an imaging device to execute a computer program stored in a memory serving as a storage medium (not illustrated). However, some or all of the functional blocks may be implemented by hardware. As the hardware, a dedicated circuit (ASIC), a processor (a reconfigurable processor or a DSP), or the like can be used.

Each functional block illustrated in FIG. 2 may not be embedded in the same casing or the imaging device may be configured with separate devices connected via a signal path. The foregoing description in FIG. 2 similarly applies to FIGS. 4, 6, 10, 12, 13, 16, 18, and 19.

A signal of the first angular velocimeter 15pg is subjected to integration by an angular velocity integration unit 12pa and is converted into an angle blur indicated by an arrow 15p of FIG. 1. A signal of the angular velocity integration unit 12pa is input to an angle blur target value calculation unit 12pb and is gain-adjusted in accordance with characteristics or a focal distance of an imaging optical system. An angle blur correction target value gain-adjusted by the angle blur target value calculation unit 12pb is input to the driving unit 13b. The blur correction lens 13c is driven in the direction of an arrow 13y by the driving unit 13b and corrects a pitch angle blur of FIG. 1.

After a signal of the first accelerometer 16ya is subjected to two-step integration by an acceleration integration unit 12yc and is converted into a displacement amount, only a component of a desired frequency (for example, 1 Hz) is extracted by a displacement bandpass filter 12yd. Similarly, from the angle blur which is an output of the above-described angular velocity integration unit 12pa, only a component of a desired frequency (for example, 1 Hz) is also extracted by an angle bandpass filter 12pe. Here, a bandpass of the angle bandpass filter 12pe is set to be substantially equal to a bandpass of the displacement bandpass filter 12yd.

A rotation radius calculation unit 12yf calculates a ratio between a displacement signal and an angle signal of the same frequency band respectively extracted by the displacement bandpass filter 12yd and the angle bandpass filter 12pe. Then, from this ratio, an angular velocimeter rotation radius 17y from a rotational center 17yc of a blur to the first accelerometer 16ya is obtained.

That is, the rotation radius calculation unit calculate a rotation radius of an angle blur based on an output of the angle blur detection unit (also sometimes referred to as an angle blur signal) and an output of the parallel blur detection unit (also sometimes referred to as a parallel blur signal).

Since a distance between the rotational center 17yc and the first accelerometer 16ya is sufficiently large, the angular velocimeter rotation radius 17y is approximately displayed as a distance in the optical axis direction between the rotational center 17yc and the first accelerometer 16ya.

Subsequently, a preset rotation radius 18y from the first accelerometer 16ya to a main point of the imaging optical system 13 is added to the angular velocimeter rotation radius 17y to obtain an optical system rotation radius 19y which is a rotation radius of the imaging optical system. Since a distance between the rotational center 17yc and a main point of the imaging optical system 13 is sufficiently large, the optical system rotation radius 19y is approximately displayed as a distance in the optical axis direction between the rotational center 17yc and the imaging optical system 13.

The optical system rotation radius 19y output from the rotation radius calculation unit 12yf is input to a multiplication unit 12yh via a rotation radius prediction unit 12yg to be described below. The multiplication unit 12yh obtains a product of the input optical system rotation radius 19y and the angle blur input from the angular velocity integration unit 12pa and recalculates a parallel blur in the direction of the arrow 16y.

When the optical system rotation radius 19y is temporarily ascertained in this manner, stabilization can be achieved with only the signal of the first angular velocimeter 15pg without using the signal of the first accelerometer 16ya, and thus a parallel blur in the direction of the arrow 16y can be detected.

An output of the multiplication unit 12yh is input to a parallel blur correction target value calculation unit 12yi and is gain-adjusted in accordance with characteristics or an image magnification of the imaging optical system 13. A parallel blur correction target value gain-adjusted by the parallel blur correction target value calculation unit 12yi is input to the driving unit 13b and a parallel blur in the y direction (the longitudinal direction) of FIG. 1 is corrected.

Figure 3:
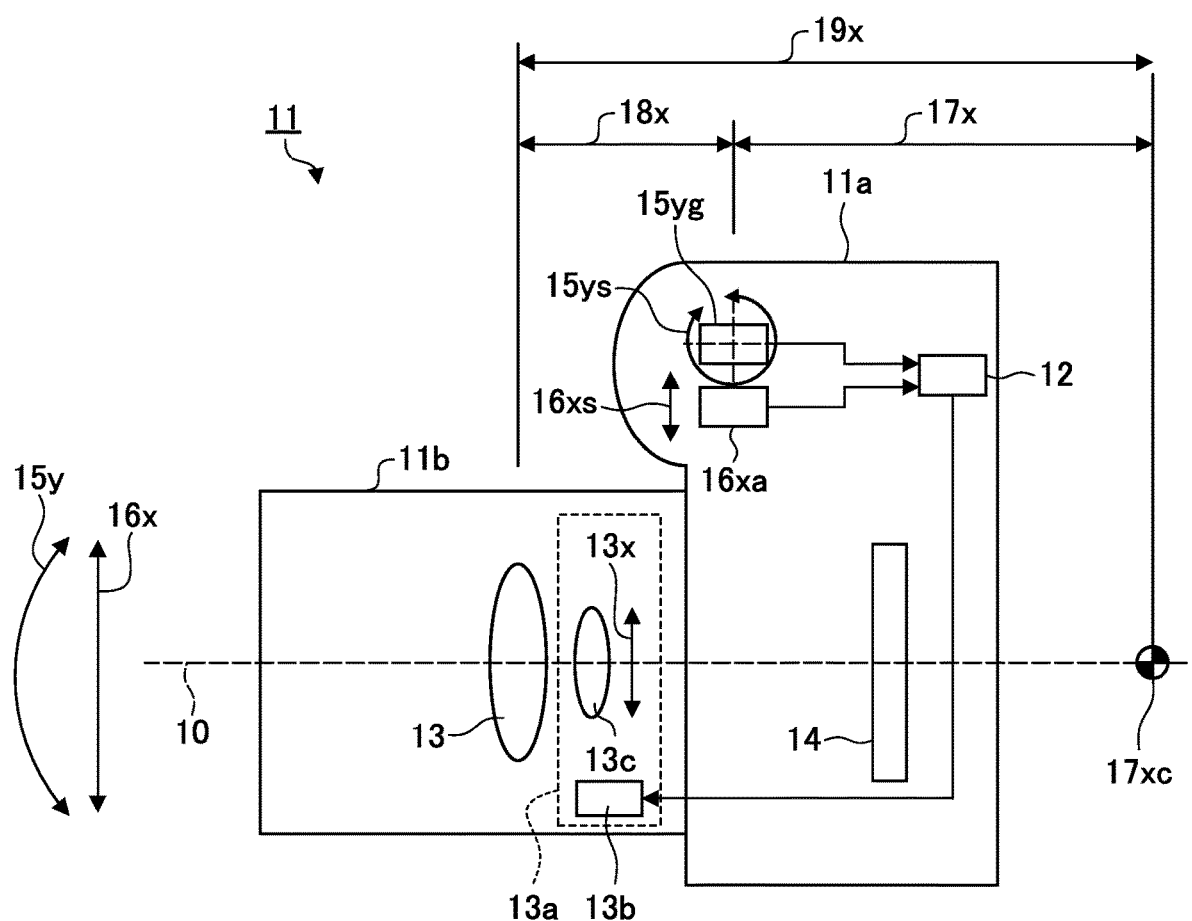
FIG. 3 is a top view illustrating the camera according to the first embodiment.

FIG. 3 is a top view illustrating the camera according to the first embodiment. In FIG. 3, the vertical direction of FIG. 3 is referred to as a transverse direction of the camera.

In FIG. 3, reference numeral 15yg denotes a second angular velocimeter that serves as an angle blur detection unit and detects a blur angular velocity in a yaw direction indicated by an arrow 15ys applied to the camera 11. A signal from a second angular velocimeter 15yg is input to the CPU 12. Reference numeral 16xa denotes a second accelerometer that serves as a parallel blur detection unit and detects a blur acceleration in the transverse direction of the camera indicated by an arrow 16xs applied to the camera 11. A signal from the second accelerometer 16xa is input to the CPU 12.

Figure 4:
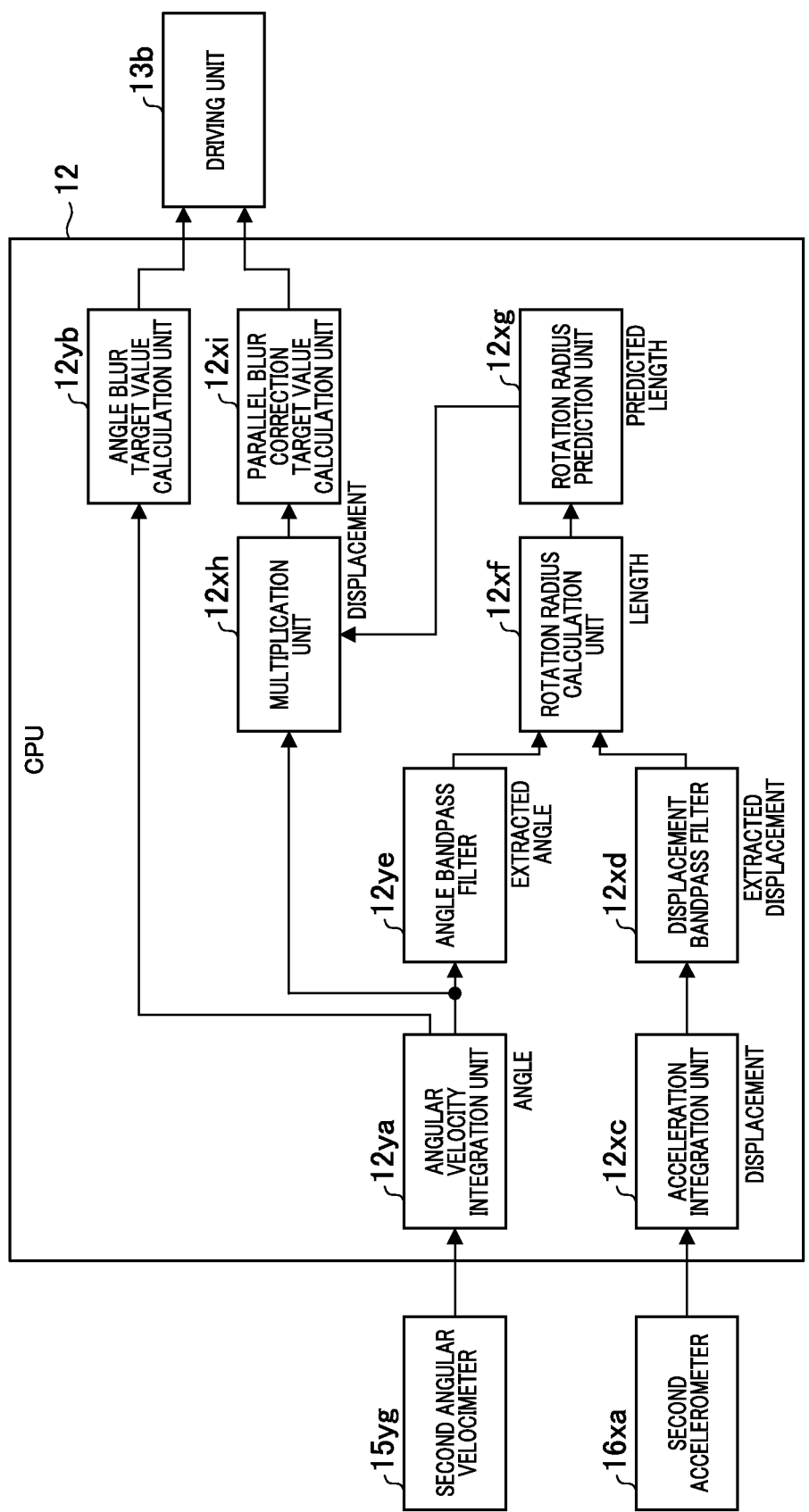
FIG. 4 is a functional block diagram illustrating the main units of the image stabilization control device in a transverse direction of the camera in FIG. 3.

FIG. 4 is a functional block diagram illustrating the main units of the image stabilization control device in the transverse direction of the camera in FIG. 3. The camera 11 is provided with all the configurations of FIGS. 4 and 2.

A signal of the second angular velocimeter 15yg is subjected to integration by an angular velocity integration unit 12ya and is converted into an angle blur indicated by an arrow 15y of FIG. 3. A signal of the angular velocity integration unit 12ya is input to an angle blur correction target value calculation unit 12yb and is gain-adjusted in accordance with characteristics or a focal distance of the imaging optical system 13. An angle blur correction target value gain-adjusted by the angle blur correction target value calculation unit 12yb is input to the driving unit 13b. The blur correction lens 13c is driven in the direction of an arrow 13x by the driving unit 13b and corrects a yaw angle blur.

After a signal of the second accelerometer 16xa is subjected to two-step integration by an acceleration integration unit 12xc and is converted into a displacement amount, only a component of a desired frequency (for example, 1 Hz) is extracted by a displacement bandpass filter 12xd. Similarly, from a signal of the second angular velocimeter 15yg converted into the angle by the above-described angular velocity integration unit 12ya, only a component of a desired frequency (for example, 1 Hz) is also extracted by an angle bandpass filter 12ye.

Here, a bandpass of the angle bandpass filter 12ye is set to be substantially equal to a bandpass of the displacement bandpass filter 12xd. A rotation radius calculation unit 12xf obtains an angular velocimeter rotation radius 17x from a rotational center 17xc of a blur to the second accelerometer 16xa from a ratio between a displacement signal and an angle signal of the same frequency band respectively extracted by the displacement bandpass filter 12xd and the angle bandpass filter 12ye.

Since a distance between the rotational center 17xc and the second accelerometer 16xa is sufficiently large, in FIG. 3, the angular velocimeter rotation radius 17x is approximately displayed as a distance in the optical axis direction between the rotational center 17xc and the second accelerometer 16xa.

Subsequently, a preset rotation radius 18x from the second accelerometer 16xa to a main point of the imaging optical system 13 is added to the angular velocimeter rotation radius 17x to obtain an optical system rotation radius 19x which is a rotation radius of the imaging optical system. Since a distance between the rotational center 17xc and a main point of the imaging optical system 13 is sufficiently large, the optical system rotation radius 19x is approximately displayed as a distance in the optical axis direction between the rotational center 17xc and the imaging optical system 13 in FIG. 3.

The optical system rotation radius 19x output from the rotation radius calculation unit 12xf is input to a multiplication unit 12xh via a rotation radius prediction unit 12xg to be described below. The multiplication unit 12xh obtains a product of the input optical system rotation radius 19x and the angle signal input from the angular velocity integration unit 12ya and recalculates a blur in the direction of the arrow 16x (the transverse direction of the camera).

When the optical system rotation radius 19x is temporarily ascertained in this manner, stabilization can be achieved with only the signal of the second angular velocimeter 15yg without using the signal of the second accelerometer 16xa, and thus a parallel blur can be detected.

A signal of the multiplication unit 12xh is input to a parallel blur correction target value calculation unit 12xi and is gain-adjusted in accordance with characteristics or an image magnification of the imaging optical system. A parallel blur correction target value gain-adjusted by the parallel blur correction target value calculation unit 12xi is input to the driving unit 13b. The blur correction lens 13c is driven in the direction of the arrow 13x by the driving unit 13b and corrects the parallel blur in the transverse direction of the camera in addition to the above-described yaw angle blur correction.

Figure 5:
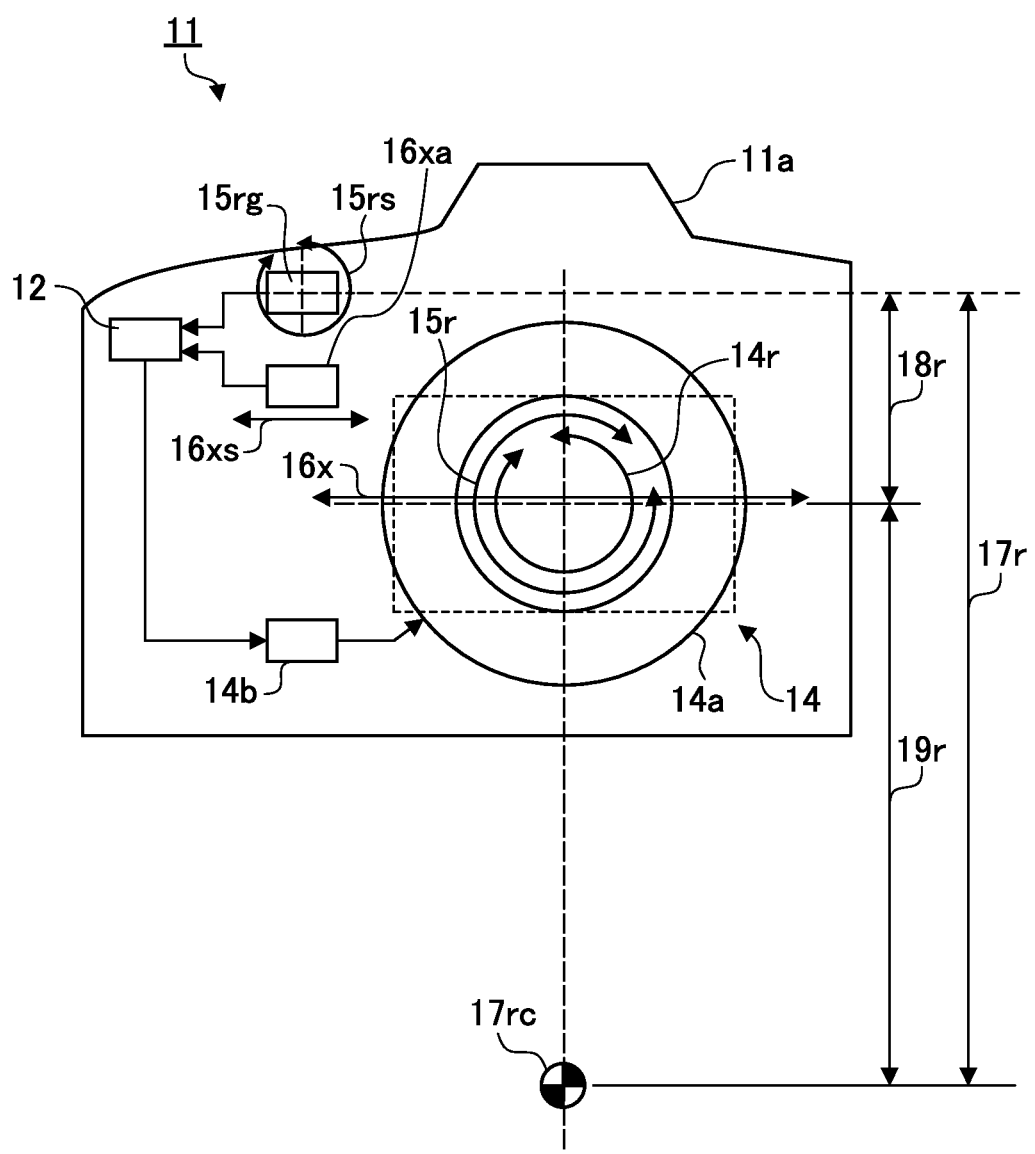
FIG. 5 is a front view illustrating the camera according to the first embodiment.

FIG. 5 is a front view illustrating the camera according to the first embodiment of the present invention. In FIG. 5, reference numeral 15rg denotes a third angular velocimeter that serves as an angle blur detection unit and detects a blur angular velocity in a direction indicated by an arrow 15rs of FIG. 5 applied to the camera 11. A signal of the third angular velocimeter 15rg is input to the CPU 12.

Figure 6:
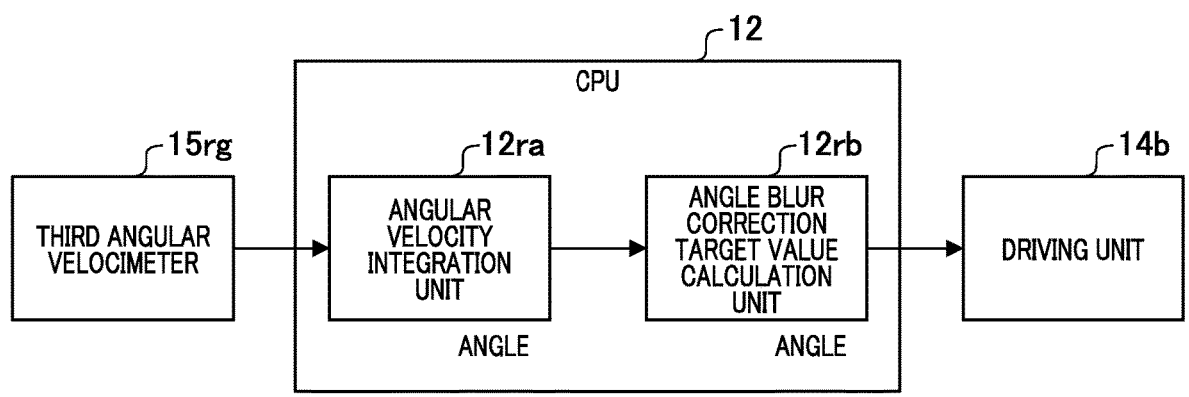
FIG. 6 is a functional block diagram illustrating the main units of the image stabilization control device in an optical axis direction of the camera in FIG. 5.

FIG. 6 is a functional block diagram illustrating the main units of the image stabilization control device in an optical axis direction in FIG. 5. The camera 11 is provided with all the configurations of FIGS. 6, 4, and 2. That is, the angle blur detection unit includes a plurality of angle blur detection sensors (first to third angular velocimeters or the like) detecting angle blurs at angles in a plurality of directions. The parallel blur detection unit also includes a plurality of parallel blur detection sensors (first and second angular velocimeters or the like) detecting parallel blurs in a plurality of directions.

A signal of the third angular velocimeter 15rg is subjected to integration by an angular velocity integration unit 12ra and is converted into a roll angle blur around an imaging optical axis indicated by an arrow 15r of FIG. 5. A signal of the angular velocity integration unit 12ra is input to an angle blur correction target value calculation unit 12rb and is gain-adjusted. An angle blur correction target value gain-adjusted by the angle blur correction target value calculation unit 12rb is input to a driving unit 14b.

The image sensor 14 is disposed, for example, above a rotator 14a forming a gear in its circumference. By causing the driving unit 14b to rotatably drive the rotator 14a in the direction of an arrow 14r, the image sensor 14 is rotated to correct a roll angle blur. Here, the image sensor 14, the rotator 14a, and the driving unit 14b form a blur correction control unit.

As described above, in the present embodiment, the optical system rotation radii 19y and 19x and the first and second angular velocimeters 15pg and 15yg are used to calculate a parallel blur in the y direction (the longitudinal direction of the camera) and the x direction (the transverse direction of the camera) during an exposure period. Accordingly, even when noise occurs in an acceleration system due to vibration of focus driving at the time of exposure or vibration of shutter driving during exposure, there is no influence and parallel blur detection accuracy does not deteriorate.

Here, if a rotation radius is merely fixed during the exposure to avoid the influence of noise of the accelerometer during exposure, there is a problem that the parallel blur detection accuracy deteriorates when the rotation radius is changed actually during the exposure. The foregoing problem will be described with reference to FIGS. 7A to 9B.

Figure 7A:
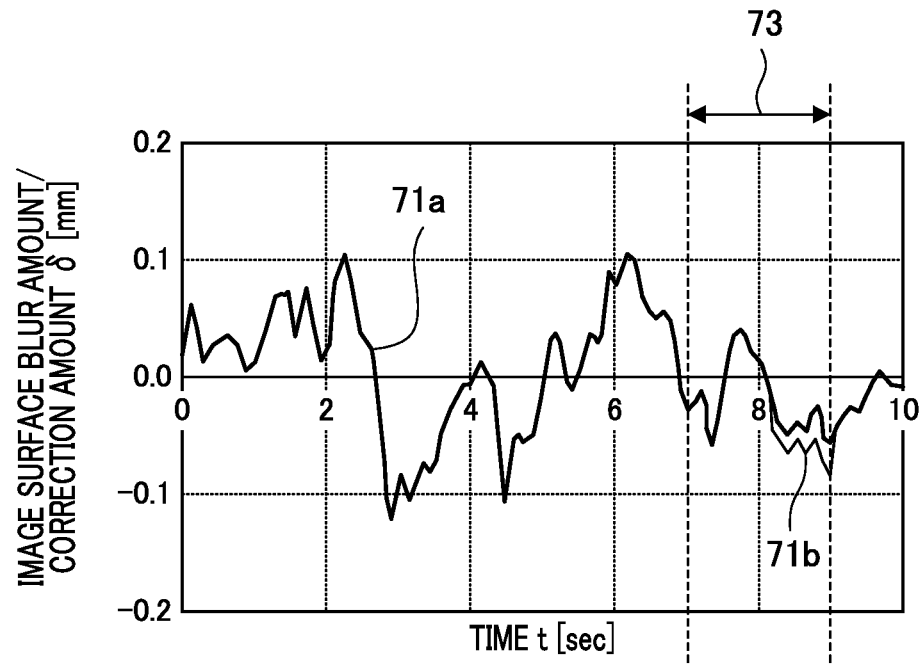
FIGS. 7A and 7B are diagrams illustrating examples of a change in a blur amount/correction amount in an image surface occurring due to a parallel blur.
Figure 7B:
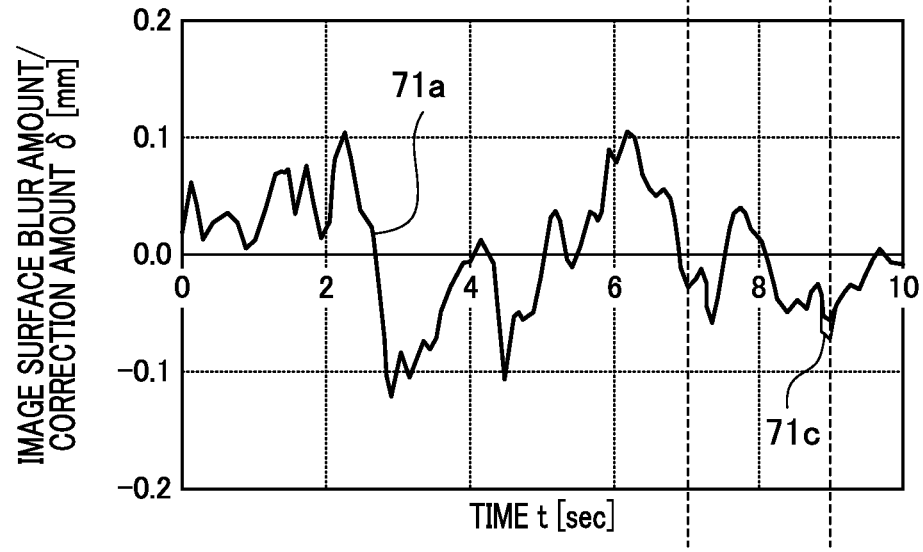

FIGS. 7A and 7B are diagrams illustrating examples of a change in a blur amount/correction amount in an image surface occurring due to a parallel blur. It is preferable to perform blur correction to match a waveform of an image surface blur amount. FIG. 7A is a diagram illustrating examples of an actual image surface blur amount waveform 71*a* and a correction amount waveform 71*b*. That is, reference numeral 71*a* denotes an image surface blur amount waveform indicating an actual blur amount of an image on an image surface due to a parallel blur applied to the camera 11 and reference numeral 71*b* denotes an exemplary correction amount waveform when the blur correction control unit is driven based on a parallel blur correction target value calculated by fixing a rotation radius during an exposure period 73.

Figure 8A:
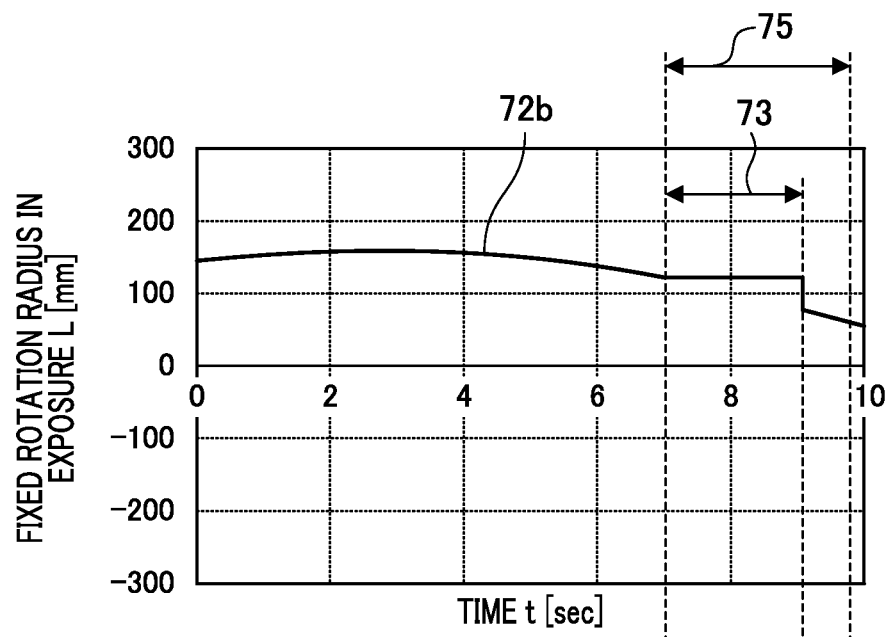
FIGS. 8A to 8C are diagrams illustrating a change in a rotation radius.
Figure 8B:
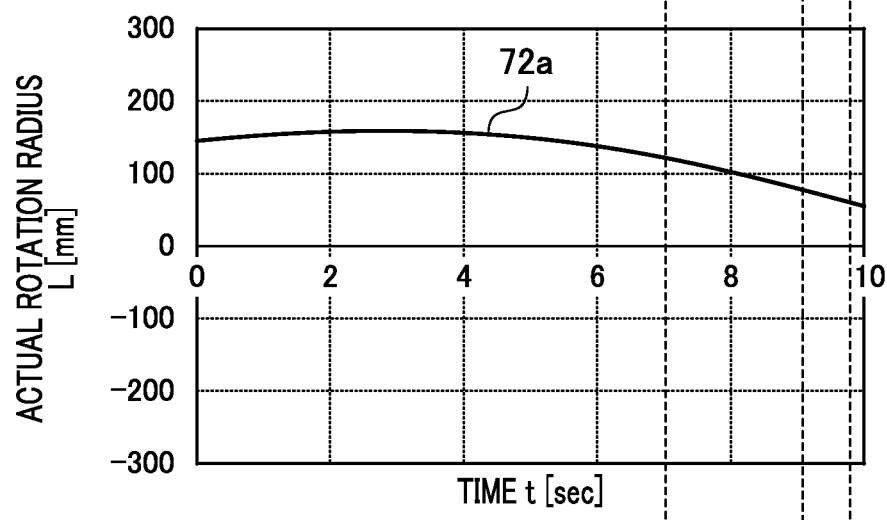
Figure 8C:
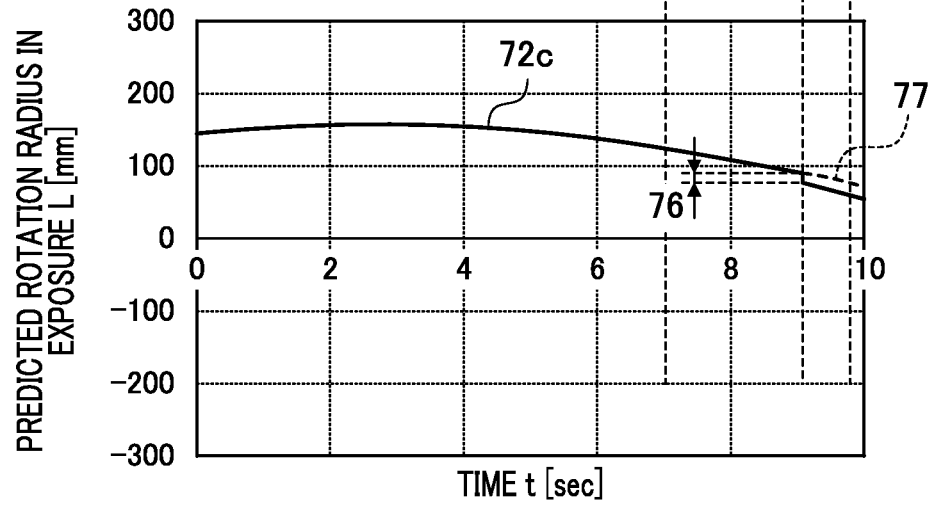

FIGS. 8A to 8C are diagrams illustrating a change in a rotation radius. FIG. 8A is a diagram illustrating a rotation radius when the rotation radius is fixed during the exposure period 73 and FIG. 8B is a diagram illustrating an exemplary change in the actual rotation radius.

The image surface blur amount waveform 71*a* indicating the actual blur amount in FIG. 7A is obtained by a product of a rotation radius waveform 72*a* which is the actual rotation radius illustrated in FIG. 8B and an actual angle blur applied to the camera 11.

However, as illustrated in FIG. 8A, an error between a rotation radius waveform 72*b* when the rotation radius is fixed (not updated) during the exposure period 73 and the actual rotation radius waveform 72*a* illustrated in FIG. 8B occurs in some cases.

Figure 9A:
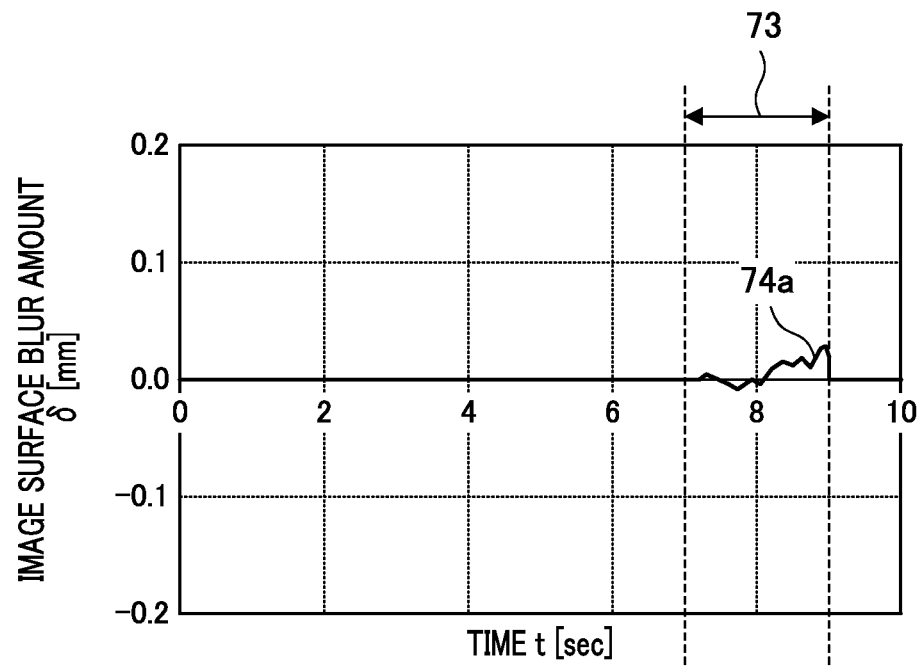
FIGS. 9A and 9B are diagrams illustrating a difference between a waveform of an image surface blur amount and a waveform of a blur correction amount.
Figure 9B:
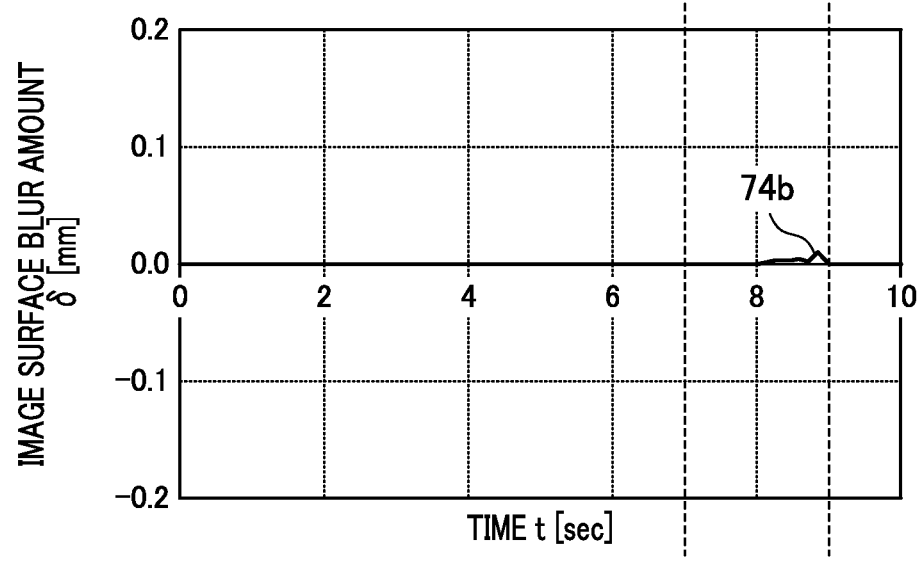

FIGS. 9A and 9B are diagrams illustrating a difference between a waveform of an image surface blur amount and a waveform of a blur correction amount. During the exposure period 73, a blur occurs in a waveform, between the image surface blur amount waveform 71*a* and the correction amount waveform 71*b*, as illustrated in FIG. 7A. As a result, as illustrated in FIG. 9A, a blur remaining waveform (a correction error) 74*a* which is a difference in the blur between both the waveforms occurs.

Accordingly, in the present embodiment, the rotation radius prediction units 12*yg* and 12*xg* are provided to calculate a predicted rotation radius waveform 72*c* illustrated in FIG. 8C by predicting a rotation radius during exposure. That is, the rotation radius prediction unit 12*xg* or 12*yg* predict a rotation radius during exposure based on a change history of the rotation radius output by the rotation radius calculation unit 12*xf* or 12*yf* at a predetermined time before (for example, 1 second before) the time of starting of the exposure and calculates the predicted rotation radius waveform 72*c*.

That is, the rotation radius prediction unit predicts a change in a rotation radius based on an output of the rotation radius calculation unit and outputs a rotation radius prediction signal.

FIG. 7B is a diagram illustrating a correction amount waveform 71*c* when blur correction is performed for the exposure period 73 based on the predicted rotation radius waveform 72*c*. FIG. 8C is a diagram illustrating a decrease in a difference between the predicted rotation radius waveform 72*c* and the actual rotation radius waveform 72*a*. FIG. 9B is a diagram illustrating a decrease in a correction error 74*b* which is a difference between the image surface blur amount waveform 71*a* and the correction amount waveform 71*c* in FIG. 7B. That is, the correction error 74*b* illustrated in FIG. 9B when the predicted rotation radius waveform 72*c* is calculated and the blur correction is performed can be considerably reduced compared to the correction error 74*a* illustrated in FIG. 9A.

Here, an example of a prediction method for a rotation radius using an adaptive filter will be described as a prediction method for a rotation radius in the rotation radius prediction unit 12*yg* or 12*xg*.

Figure 10:
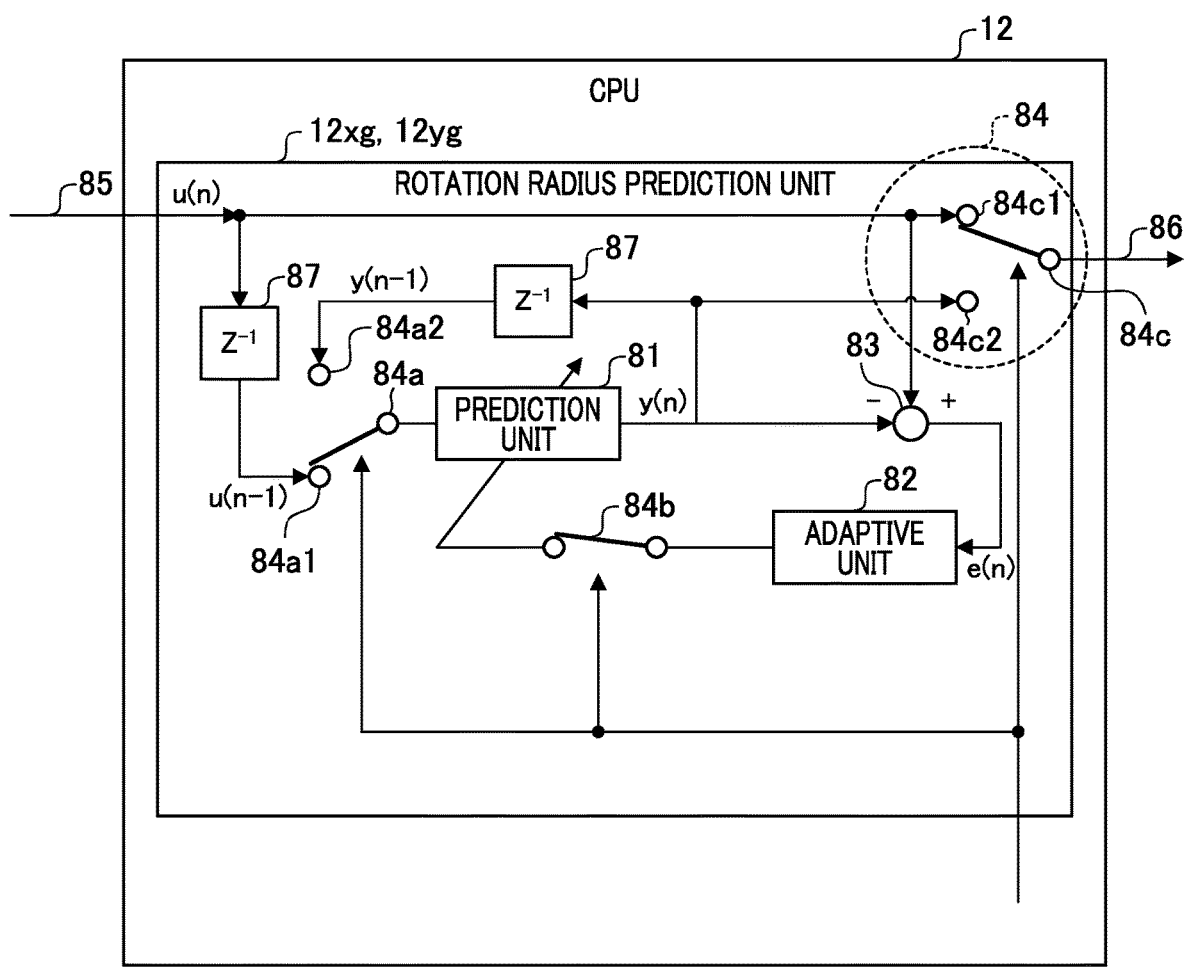
FIG. 10 is a functional block diagram illustrating a rotation radius prediction unit according to the first embodiment.

FIG. 10 is a functional block diagram illustrating the rotation radius prediction unit according to the first embodiment. Reference numeral 81 denotes a prediction unit and reference numeral 82 denotes an adaptive unit. Reference numeral 83 denotes a subtractor, reference numeral 84*a* denotes a prediction unit input switching unit, and reference numerals 84*a*1 and 84*a*2 denote contact points in the prediction unit input switching unit 84*a*. Reference numeral 84*b* denotes an adaptive operational switch, reference numeral 84*c* denotes an output switching unit, and reference numerals 84*c*1 and 84*c*2 denote contact points in the output switching unit 84*c*.

Reference numerals 84*c*, 84*c*1, and 84*c*2 form a prediction switching unit 84. Reference numeral 85 denotes an input terminal in the rotation radius prediction unit 12*xg* or 12*yg* and a signal from the rotation radius calculation unit 12*xf* or 12*yf* is input, Reference numeral 86 denotes an output terminal from the rotation radius prediction unit 12*xg* or 12*yg* and reference numeral 87 denotes a unit delay unit. Reference numeral u(n), y(n), and e(n) respectively denote an input value, a prediction value, and a prediction error of the rotation radius calculation unit 12*xf* or 12*yf*.

First, a case in which a signal is input from the rotation radius calculation unit 12*xf* or 12*yf* before start of exposure will be described. In this case, the CPU 12 switches the prediction unit input switching unit 84*a* to the side of the contact point 84*a*1, turns the adaptive operation switch 84*b* on, and switches the output switching unit 84*c* to the side of the contact point 84*c*1. In the present embodiment, this state is referred to as an adaptive operation or an adaptive operation state.

In this case, an input value u(n−1) subjected to unit delay by the unit delay unit 87 is input to the prediction unit 81 via the prediction unit input switching unit 84*a*. The prediction unit 81 outputs a current prediction value y(n) based on a previous input value. That is, the prediction unit 81 generates a current prediction unit y(n) based on a previous input value u(n−1) earlier by one sample in an n-th sample.

The subtractor 83 calculates a difference e(n)=u(n)−y(n) (that is, a prediction error) between the input value u(n) and the prediction value y(n). The adaptive unit 82 updates the prediction unit 81 using the prediction error in accordance with a predetermined adaptive algorithm. Since the output switching unit 84*c* comes into contact with the side of the contact point 84*c*1, the current input value u(n) input to the input terminal 85 is selected as an output signal and is output to the output terminal 86 via the output switching unit 84*c*, as it is.

In this way, the signal from the input terminal 85 is output to the output terminal 86, as it is, until the exposure starts and the adaptive unit 82 performs an adaptive operation of the prediction unit 81.

Next, an operation after the start of exposure will be described. In this case, the CPU 12 switches the prediction unit input switching unit 84*a* to the side of the contact point 84*a*2, turns the adaptive operation switch 84*b* off, and switches the output switching unit 84*c* to the side of the contact point 84*c*2. Accordingly, the prediction unit 81 inputs the previous prediction value y(n−1) to the prediction unit 81 as a feedback via the prediction unit input switching unit 84*a*.

The prediction unit 81 outputs the prediction value y(n) based on the previous prediction value input as the feedback. Since the adaptive operation switch 84*b* is turned off, the operations of the adaptive unit 82 and the subtractor 83 stop. Them, the output switching unit 84*c* comes into contact with the side of the contact point 84*c*2, the prediction value y(n) is selected as an output signal and is output to the output terminal 86. In the present embodiment, this state is referred to as a prediction operation or a prediction operation state.

In this way, during the exposure, the prediction value generated by the prediction unit 81 is output to the output terminal 86 and a prediction operation is performed.

In addition to the prediction scheme described with reference to FIG. 10, any of various methods such as linear prediction or a Kaman filter from a rotation radius change history can be used to predict a change in the rotation radius during the exposure. In this way, by predicting the rotation radius during the exposure, a change in a rotation radius of the predicted rotation radius waveform 72*c* during the exposure period 73 can be closer to the actual rotation radius waveform 72*a* than a change in the rotation radius of the rotation radius waveform 72*b* during the exposure period 73 in FIG. 8A.

As described above, the correction amount waveform 71*c* in FIG. 7B is obtained by a product of a signal of the rotation radius prediction unit 12*xg* or 12*yg* and a signal of an angular velocity integration unit 12*xa* or 12*ya*. For the blur remaining waveform (correction error) 74*b* in FIG. 9B which is a difference between the image surface blur amount waveform 71*a* and the correction amount waveform 71*c*, a blur remainder can be reduced than the blur remaining waveform 74*a* in FIG. 9A.

As illustrated in FIG. 8B, the actual rotation radius waveform 72*a* has a lower frequency than the image surface blur amount waveform 71*a*. Therefore, in the present embodiment, a correction waveform during exposure is not predicted from a history of the parallel blur waveform or the parallel blur correction amount, but the correction waveform is calculated based on a prediction result of the rotation radius waveform 72*b*. Thus, there is an effect that the stable and high-accurate correction amount waveform 71*c* can be acquired.

As described above, noise occurring in an accelerometer due to vibration of focus driving caused in an exposure operation and vibration of shutter driving during exposure may deteriorate detection of a parallel blur. To prevent this, in the present embodiment, a predicted rotation radius is used during the exposure. Further, in the present embodiment, when vibration does not occur even during the exposure period, the rotation radius obtained in calculation is used to predict a rotation radius only during occurrence of vibration for the exposure period.

At this time, in the present embodiment, when the output switching unit 84*c* is switched to the side of the contact point 84*c*1 from a state in which the prediction value generated by prediction unit 81 is output to the output terminal 86 and the predicted rotation radius is supplied, the rotation radius is not considerably changed. That is, the rotation radius is smoothly connected, and thus the stable blur correction can be performed.

That is, when an exposure period 75 is longer than an exposure period 73 and a rotation radius obtained in real-time calculation is used after the exposure period 73 in FIG. 8C, a gap 76 does not occur in the final of the exposure period 73 in the predicted rotation radius waveform 72*c*. Therefore, blur correction is pertained to be continuously connected from a predicted waveform to a calculated waveform by using a dotted waveform 77 obtained by offsetting the value of a subsequently continuing calculated rotation radius in accordance with the value of the end of the exposure period 73 of the predicted rotation radius. When the waveform is switched to make a smooth change from the predicted waveform to the calculated waveform, the waveform may be passed through a lowpass filter.

Figure 11:
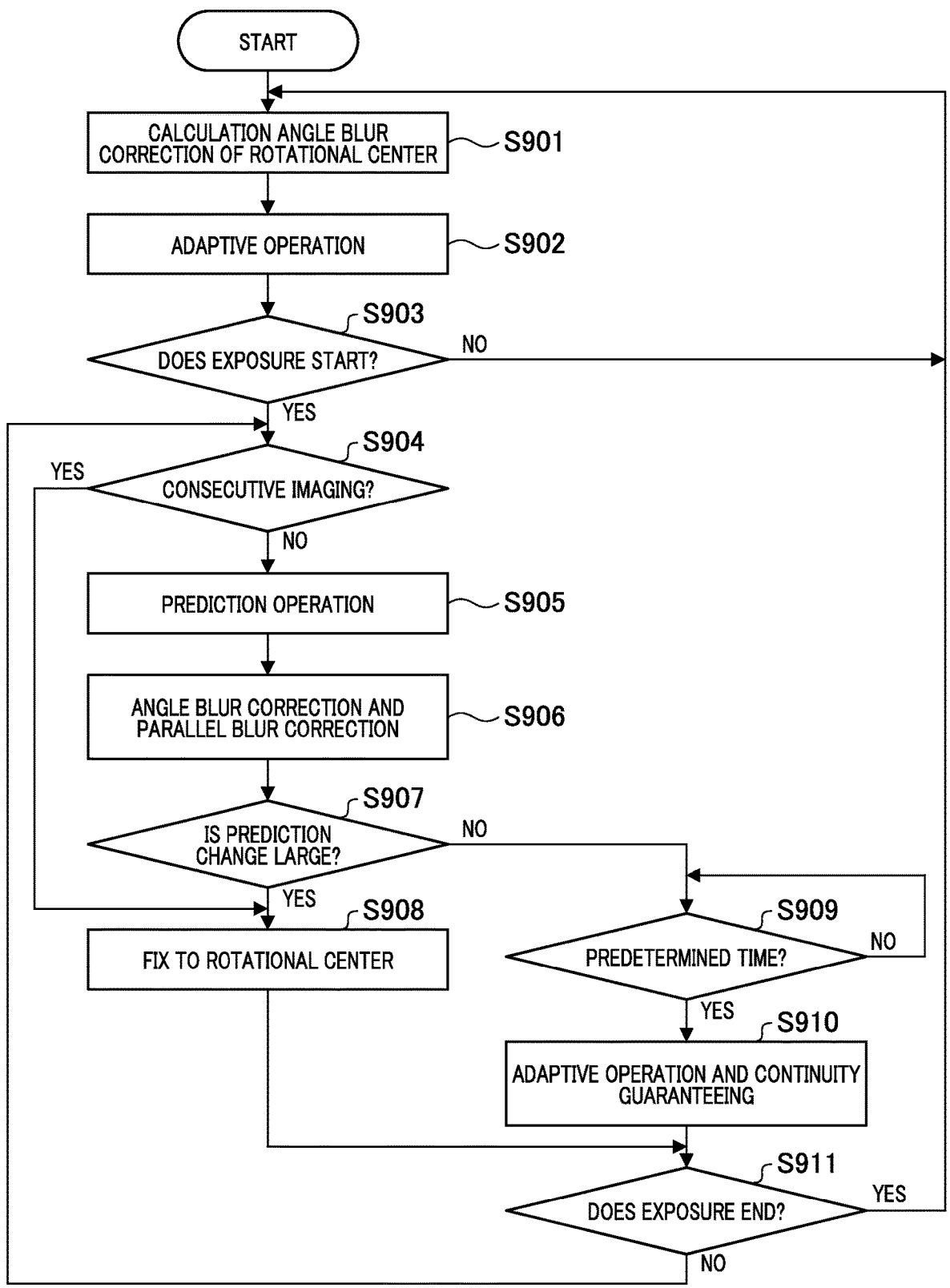
FIG. 11 is a flowchart illustrating image stabilization control of the camera according to the first embodiment.

FIG. 11 is a flowchart illustrating image stabilization control of the camera according to the first embodiment. The CPU 12 serving as a computer executes a computer program stored in a memory to perform an operation of each step of the flowchart of FIG. 11.

The flow of FIG. 11 starts when the camera 11 is powered on. In step S901, as described with reference to FIGS. 2 and 4, the rotation radius calculation unit 12*xf* or 12*yf* calculates a rotation radius of a parallel blur. Angle blur correction also starts.

In step S902, the rotation radius prediction unit 12*xg* or 12*yg* starts an adaptive operation to prepare for rotation radius prediction by using the adaptive unit 82 based on subsequently input rotation radius information, That is, in the adaptive operation, the prediction unit input switching unit 84*a* in FIG. 10 is switched to the side of the contact point 84*a*1, adaptive operation switch 84*b* is turned on, and the output switching unit 84*c* is switched to the side of the contact point 84*c*1.

In step S903, it is determined whether an exposure manipulation is performed by the photographer. In the case of No, the process returns to step S901 to continue the calculation radius and the angle blur correction. By repeating a loop from steps S901 to S904 here, it is possible to improve adaptive accuracy in the rotation radius prediction unit 12*xg* or 12*yg*.

When it is determined in step S903 that the exposure starts, the process proceeds to step S904. In step S904, it is determined whether consecutive imaging is performed. When the consecutive imaging is performed, the process proceeds to step S908 and the prediction of the rotation radius is not performed. This is because prediction accuracy of the rotation radius is gradually lowered since repeated imaging is performed for a long time at the time of consecutive imaging. When the consecutive imaging is not performed, the process proceeds to step S905.

In step S905, the rotation radius prediction unit 12*xg* or 12*yg* starts outputting the rotation radius predicted by switching the adaptive operation using the adaptive unit 82 to the prediction operation. That is, in the prediction operation, the prediction unit input switching unit 84*a* in FIG. 10 is switched to the side of the contact point 84*a*2, the adaptive operation switch 84*b* is turned off, and the output switching unit 84*c* is switched to the side of the contact point 84*c*2 to start outputting the predicted rotation radius.

In step S906, in addition to the angle blur correction, parallel blur correction based on the predicted rotation radius starts.

In step S907, when the predicted rotation radius is considerably different from the rotation radius calculated in the adaptive operation before the exposure (for example, in the case of 1.5 times), it is determined that the prediction fails and the process proceeds to step S908, the prediction of the rotation radius is stopped, and the rotation radius is fixed to a preset rotational center. In the case of No in step S907, the process proceeds to step S909.

In step S909, a predetermined time is awaited. The predetermined time is a preset time (for example, 0.2 seconds) necessary until disturbance vibration caused in the exposure operation dies down. The prediction of the rotation radius continues during the predetermined time. When the predetermined time has passed, the process proceeds to step S910. Here, step S909 functions as a determination unit that determines whether the disturbance vibration occurs during a period equal to or greater than a predetermined value based on whether the predetermined time has passed.

In addition to the method of determining an elapsed time until disturbance vibration dies down as in step S909, the process may proceed to step S910 when a vibration sensor is provided and disturbance vibration is reduced.

In step S910, the prediction switching unit 84 switches an operation from the prediction operation to an adaptive operation of outputting an output of the rotation radius calculation unit 12xf or 12yf to the multiplication unit 12xh or 12yh. That is, the prediction unit input switching unit 84a in FIG. 10 is switched to the side of the contact point 84a1, the adaptive operation switch 84b is turned on, and the output switching unit 84c is switched to the side of the contact point 84c1.

At this time, as described with reference to FIG. 8C, a process of keeping continuity of the rotation radius is performed. That is, the blur correction control unit operates to decrease a difference between the correction of the parallel blur which is based on the rotation radius prediction signal and the output of the angle blur detection unit and the correction of the parallel blur which is based on the output of the rotation radius calculation unit and the output of the angle blur detection unit.

In step S911, it is determined whether the exposure is completed. The process returns to step S904 to continue the blur correction until the exposure is completed. When the exposure is completed, the process returns to step S901.

In the present embodiment, the blur correction control unit 13a is configured by operating the blur correction lens 13c in the direction of the arrow 13x or 13y, but the blur correction control unit may be configured by operating the image sensor 14 in the direction of the arrow 13x or 13y using the driving unit 14b. Alternatively, the blur correction control unit may be configured by shifting the reading region of the image sensor 14 in the direction of the arrow 13x or 13y. Alternatively, the blur correction control unit may be configured by temporarily storing an image signal read from the image sensor 14 in a memory and shifting the reading region from the memory in the direction of the arrow 13x or 13y.

In this way, the blur correction control unit includes a reading region changing unit that changes a reading region of an image acquired by the imaging unit. The blur correction control unit may use any method as long as the correction of a parallel blur is controlled based on a rotation radius prediction signal of the rotation radius prediction unit and an output of the angle blur detection unit.

In this way, in the present embodiment, when a parallel blur is corrected based on the output of the prediction unit 81 and the output of the angle blur detection unit for an exposure period in which disturbance vibration easily occurs and the disturbance vibration dies down, the parallel blur is corrected based on the output of the rotation radius calculation unit and the output of the angle blur detection unit. That is, for a period in which the disturbance vibration is equal to or greater than a predetermined value, the blur correction unit corrects the parallel blur based on a rotation radius prediction signal and the output of the angle blur detection unit. Conversely, for a period in which the disturbance vibration is less than the predetermined value, the parallel blur is corrected based on the output of the rotation radius calculation unit and the output of the angle blur detection unit.

In this way, in the present embodiment, a prediction blur with high accuracy can be achieved by predicting a parallel blur for the period in which disturbance vibration easily occurs using a change history of the rotational center. A deterioration in an image can be reduced by performing the blur correction with higher accuracy.

Second Embodiment

Figure 12:
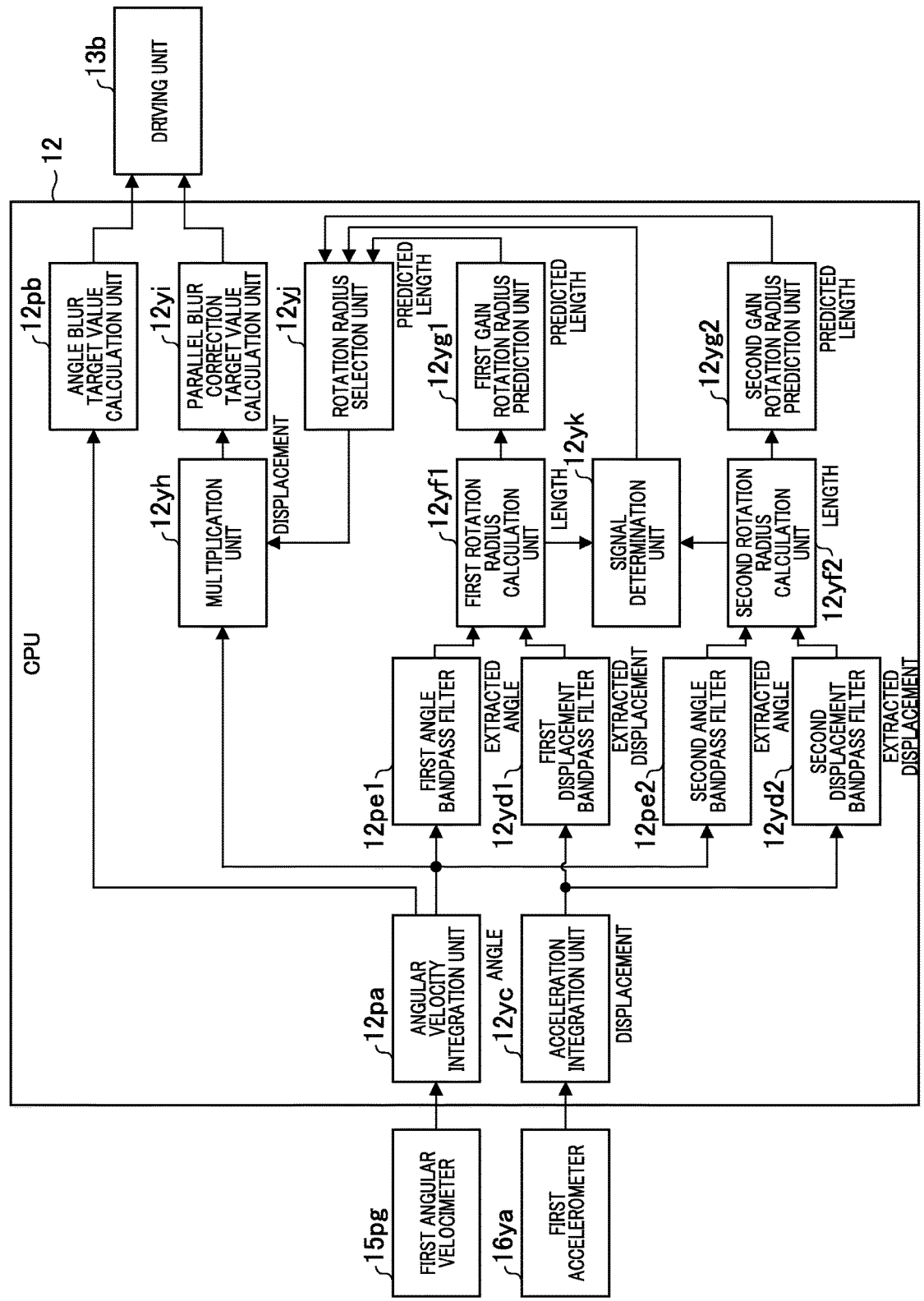
FIG. 12 is a functional block diagram illustrating main units of an image stabilization control device in a longitudinal direction of a camera according to a second embodiment of the present invention.

A configuration of a camera according to a second embodiment will be described with reference to FIGS. 12 to 14. FIG. 12 is a functional block diagram illustrating main units of an image stabilization control device in a longitudinal direction of the camera according to the second embodiment of the present invention and is a diagram in which a part of the functional block diagram of FIG. 2 is changed.

That is, the functional block diagram of FIG. 12 differs from the functional block diagram of FIG. 2 in that a rotation radius is obtained at each frequency via a plurality of bandpass filters with different frequencies and an adaptive operation for each rotation radius is in progress in parallel. Further, the functional block diagram differs in that a parallel blur correction target value in the longitudinal direction is obtained based on one rotation radius at each frequency.

Differences between FIGS. 12 and 2 will be described. An output signal of the first accelerometer 16ya is subjected to two-step integration by the acceleration integration unit 12yc to be converted into a displacement amount. A first displacement bandpass filter 12yd1 extracts only a component of a first frequency (for example, 0.5 Hz) from an output of the acceleration integration unit 12yc. Similarly, a first angle bandpass filter 12pe1 also extracts only a component of the first frequency (for example, 0.5 Hz) from a signal of the first angular velocimeter 15pg converted into an angle by the angular velocity integration unit 12pa.

A first rotation radius calculation unit 12yf1 calculates a first angular velocimeter rotation radius 17y1 in the longitudinal direction based on an output of the first displacement bandpass filter 12yd1 and an output of the first angle bandpass filter 12pe1 and further obtains an optical system rotation radius 19y1 in the longitudinal direction.

A first gain rotation radius prediction unit 12yg1 predicts a first optical system rotation radius in the longitudinal direction during exposure based on a change history of the first optical system rotation radius in the longitudinal direction output by the first rotation radius calculation unit 12yf1 (for example, 2 seconds before).

From an output signal of the acceleration integration unit 12yc, only a component of a second frequency (for example, 2 Hz) different from the first frequency is extracted by a second displacement bandpass filter 12yd2. Similarly, from an output signal of the angular velocity integration unit 12pa, only a component of the second frequency (for example, 2 Hz) different from the first frequency is also extracted by a second angle bandpass filter 12pe2.

A second rotation radius calculation unit 12yf2 calculates a second angular velocimeter rotation radius 17y2 in the longitudinal direction based on an output of the second displacement bandpass filter 12yd2 and an output of the second angle bandpass filter 12pe2 and further obtains an optical system rotation radius 19y2 in the longitudinal direction.

A second gain rotation radius prediction unit 12yg2 predicts a second optical system rotation radius in the longitudinal direction during exposure based on a change history of the second optical system rotation radius in the longitudinal direction output by the rotation radius calculation unit 12yf2 (for example, 0.5 seconds before).

In this way, in the present embodiment, a plurality of bandpass filters extracting different frequency components from an output of the angle blur detection unit and an output of the parallel blur detection unit are provided. The plurality of rotation radius prediction units predict a rotation radius of an angle blur based on the plurality of bandpass filter signals.

For the output signals of the first gain rotation radius prediction unit 12yg1 and the second gain rotation radius prediction unit 12yg2, one optical system rotation radius is selected by the rotation radius selection unit 12yj and is output to the multiplication unit 12yh.

A selection standard for the rotation radius selection unit 12yj will be described. A signal determination unit 12yk compares an output of the first displacement bandpass filter 12yd1 input to the first rotation radius calculation unit 12yf1 with an output of the second displacement bandpass filter 12yd2 input to the first rotation radius calculation unit 12yf1 and transmits a comparison result to the rotation radius selection unit 12yj. Based on the comparison result, the rotation radius selection unit 12yj selects an optical system rotation radius calculated based on the displacement bandpass filter outputting a relatively large signal.

Specifically, when the output of the second displacement bandpass filter 12yd2 is greater than the output of the first displacement bandpass filter 12yd1, it is determined that a parallel blur of 2 Hz is characteristic and a signal of the second gain rotation radius prediction unit 12yg2 is selected and transmitted to the multiplication unit 12yh. Alternatively, the signal determination unit 12yk compares an output of the first angle bandpass filter 12pe1 input to the first rotation radius calculation unit 12yf1 with an output of the second angle bandpass filter 12pe2 and transmits a comparison result to the rotation radius selection unit 12yj.

The rotation radius selection unit 12yj selects an optical system rotation radius calculated based on the angle bandpass filter outputting a relatively large signal based on the comparison result. Specifically, when the output of the second angle bandpass filter 12pe2 is greater than the output of the first angle bandpass filter 12pe1, it is determined that the parallel blur of 2 Hz is characteristic and a signal of the second gain rotation radius prediction unit 12yg2 is selected and transmitted to the multiplication unit 12yh.

In this way, in the present embodiment, the rotation radius selection unit selects an output which is used to correct the parallel blur from the outputs of the plurality of rotation radius prediction units.

The first gain rotation radius prediction unit 12yg1 and the second gain rotation radius prediction unit 12yg2 perform a prediction operation using the prediction method described with reference to FIG. 10. The adaptive operation is simultaneously started from a time at which the camera is powered on. In the present embodiment, since the first gain rotation radius prediction unit 12yg1 and the second gain rotation radius prediction unit 12yg2 perform the adaptive operation which is calculation for prediction in parallel, measures can be taken instantaneously even when one prediction value is obtained from the rotation radius selection unit 12yj.

Here, the first gain rotation radius prediction unit 12yg1 multiplies the optical system rotation radius obtained in the prediction operation by gain 1. On the other hand, the second gain rotation radius prediction unit 12yg2 multiplies the optical system rotation radius obtained in the prediction operation by gain 0.7. That is, in the present embodiment, to avoid an influence of disturbance noise, the second gain rotation radius prediction unit 12yg2 sets a gain to be less than that of the first gain rotation radius prediction unit 12yg1 and reduces deterioration in the blur correction.

This is because disturbance noise is easily mixed since extraction frequencies of the second angle bandpass filter 12pe2 and the second displacement bandpass filter 12yd2 are higher than extraction frequencies of the first angle bandpass filter 12pe1 and the first displacement bandpass filter 12yd1. In this way, in the present embodiment, there are characteristics that the output gains of the plurality of rotation radius prediction units are different at each frequency.

A signal of the angular velocity integration unit 12pa multiplied by the multiplication unit 12yh is input to the parallel blur correction target value calculation unit 12yi and is gain-adjusted in accordance with characteristics of the imaging optical system an image magnification. The parallel blur correction target value gain-adjusted by the parallel blur correction target value calculation unit 12yi is input to the driving unit 13b. The blur correction lens 13c is driven in the direction of the arrow 13y by the driving unit 13b and the correction of the parallel blur in the longitudinal direction of the camera is performed in addition to the above-described correction of the angle blur.

Figure 13:
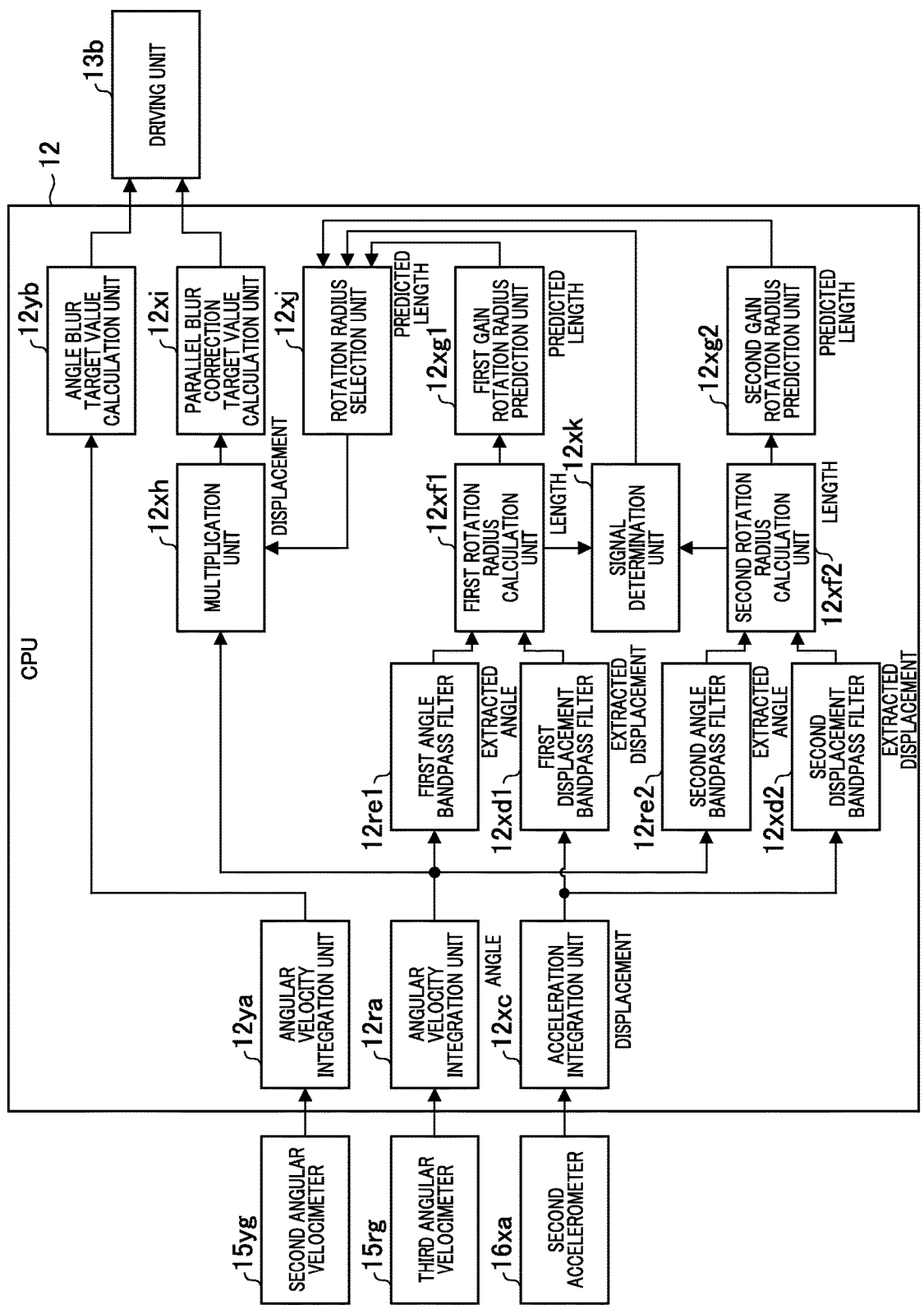
FIG. 13 is a functional block diagram illustrating main units of the image stabilization control device in a transverse direction of the camera according to the second embodiment of the present invention.

FIG. 13 is a functional block diagram illustrating main units of the image stabilization control device on an optical axis of the camera according to the second embodiment of the present invention and illustrates a modification example of the functional block diagram of FIG. 6 corresponding to the front view of the camera of FIG. 5. That is, in the functional block diagram of FIG. 13, there are characteristics that a rotation radius is obtained at each frequency via the plurality of bandpass filters with different frequencies and an operation is in progress in parallel to an adaptive operation of each rotation radius. Further, there are characteristics that the parallel blur correction target value in FIG. 5 is obtained based on one rotation radius of each frequency. In FIG. 13, an optical system rotation radius 19r illustrated in FIG. 5 is calculated. The camera 11 has all the configurations of FIGS. 13 and 12.

In FIG. 13, an output signal of the second accelerometer 16xa is subjected to two-step integration by the acceleration integration unit 12xc to be converted into a displacement amount. A first displacement bandpass filter 12xd1 extracts only a component of the first frequency (for example, 0.5 Hz) from an output of the acceleration integration unit 12xc.

Similarly, a signal of the third angular velocimeter 15rg is converted into an angle by the angular velocity integration unit 12ra and only a component of the first frequency (for example, 0.5 Hz) is extracted by a first angle bandpass filter 12re1.

A first rotation radius calculation unit 12xf1 calculates an angular velocimeter rotation radius 17r1 based on an output of the first angle bandpass filter 12re1 and an output of the first displacement bandpass filter 12xd1. Further, an optical system rotation radius 19r1 is obtained based on a distance 18r between the third angular velocimeter 15rg and the optical axis and an angular velocimeter rotation radius 17r1.

A first gain rotation radius prediction unit 12xg1 predicts an optical system rotation radius during exposure based on a change history of the optical system rotation radius output by the first rotation radius calculation unit 12xf1 (for example, 2 seconds before).

From an output signal of the acceleration integration unit 12xc, only a component of a second frequency (for example, 2 Hz) different from the first frequency is extracted by a second displacement bandpass filter 12xd2 is extracted. Similarly, from an output signal of the angular velocity integration unit 12ra, only a component of the second frequency (for example, 2 Hz) different from the first frequency is extracted by a second angle bandpass filter 12re2 is extracted.

A second rotation radius calculation unit 12xf2 calculates an angular velocimeter rotation radius 17r2 based on an output of the second displacement bandpass filter 12xd2 and an output of the second angle bandpass filter 12re2 and obtains an optical system rotation radius 19r2. Further, the optical system rotation radius 19r2 is obtained based on a distance 18r between the third angular velocimeter 15rg and the optical axis and the angular velocimeter rotation radius 17r2.

A second gain rotation radius prediction unit 12xg2 predicts an optical system rotation radius during exposure based on a change history of the optical system rotation radius output by the second rotation radius calculation unit 12xf2 (for example, 0.5 seconds before).

For the output signals of the first gain rotation radius prediction unit 12xg1 and the second gain rotation radius prediction unit 12xg2, one rotation radius is selected by the rotation radius selection unit 12xj and is output to the multiplication unit 12xh.

A signal determination unit 12xk compares an output of the first displacement bandpass filter 12xd1 input to the first rotation radius calculation unit 12xf1 with an output of the second displacement bandpass filter 12xd2 and transmits a comparison result to the rotation radius selection unit 12xj. Based on the comparison result, the rotation radius selection unit 12xj selects an optical system rotation radius calculated based on the displacement bandpass filter outputting a relatively large signal.

Specifically, when the output of the second displacement bandpass filter 12xd2 is greater than the output of the first displacement bandpass filter 12xd1, it is determined that a parallel blur of 2 Hz is characteristic and a signal of the second gain rotation radius prediction unit 12xg2 is selected and transmitted to the multiplication unit 12xh.

Alternatively, the signal determination unit 12xk compares an output of the first angle bandpass filter 12re1 input to the first rotation radius calculation unit 12xf1 with an output of the second angle bandpass filter 12re2 and transmits a comparison result to the rotation radius selection unit 12xj.

The rotation radius selection unit 12xj selects an optical system rotation radius calculated based on the angle bandpass filter outputting a relatively large signal based on the comparison result.

Specifically, when the output of the second angle bandpass filter 12re2 is greater than the output of the first angle bandpass filter 12re1, it is determined that the parallel blur of 2 Hz is characteristic and a signal of the second gain rotation radius prediction unit 12xg2 is selected and transmitted to the multiplication unit 12xh.

The first gain rotation radius prediction unit 12xg1 and the second gain rotation radius prediction unit 12xg2 perform a prediction operation using the prediction method described with reference to FIG. 10. The adaptive operation is simultaneously started from a time at which the camera is powered on. In the present embodiment, since the first gain rotation radius prediction unit 12xg1 and the second gain rotation radius prediction unit 12xg2 perform the adaptive operation which is calculation for prediction in parallel, a measure can be taken even when one prediction value is obtained from the rotation radius selection unit 12xj.

Here, the first gain rotation radius prediction unit 12xg1 multiplies the rotation radius obtained in the prediction operation by, for example, gain 1. On the other hand, the second gain rotation radius prediction unit 12xg2 multiplies the rotation radius obtained in the prediction operation by, for example, gain 0.7. That is, in the present embodiment, to avoid an influence of disturbance noise, the second gain rotation radius prediction unit 12xg2 sets a gain to be less than that of the first gain rotation radius prediction unit 12xg1 and reduces deterioration in the blur correction.

This is because disturbance noise is easily mixed since extraction frequencies of the second angle bandpass filter 12re2 and the second displacement bandpass filter 12xd2 are higher than extraction frequencies of the first angle bandpass filter 12re1 and the first displacement bandpass filter 12xd1.

The multiplication unit 12xh multiplies the optical system rotation radius 19r and an integration angle of an output signal of the third angular velocimeter 15rg output from the angular velocity integration unit 12ra. An output of the multiplication unit 12xh is input to the parallel blur correction target value calculation unit 12xi and is gain-adjusted in accordance with characteristics or an image magnification of the imaging optical system. A parallel blur correction target value gain-adjusted by the parallel blur correction target value calculation unit 12xi is input to the driving unit 13b. The blur correction lens 13c is driven in the direction of the arrow 16x by the driving unit 13b and corrects the parallel blur in the transverse direction of the camera.

In this way, in the first embodiment, the integration angle of the second angular velocimeter 15yg in FIG. 3 is multiplied by the optical system rotation radius 19x to obtain the parallel blur 16x. However, in a second embodiment, the third angular velocimeter 15rg and the rotation radius 19r are used.

In FIG. 13, the angle blur correction target value is calculated using the angle blur target value calculation unit 12pb by integrating an output of the second angular velocimeter 15yg in the angular velocity integration unit 12ya. However, outputs of the first angular velocimeter 15pg and a third angular velocimeter 15rg may be each integrated by the angular velocity integration unit, each angle blur correction target value may be calculated using the angle blur target value calculation unit, and the angle blur may be corrected in accordance with the angle blur correction target value.

Figure 14:
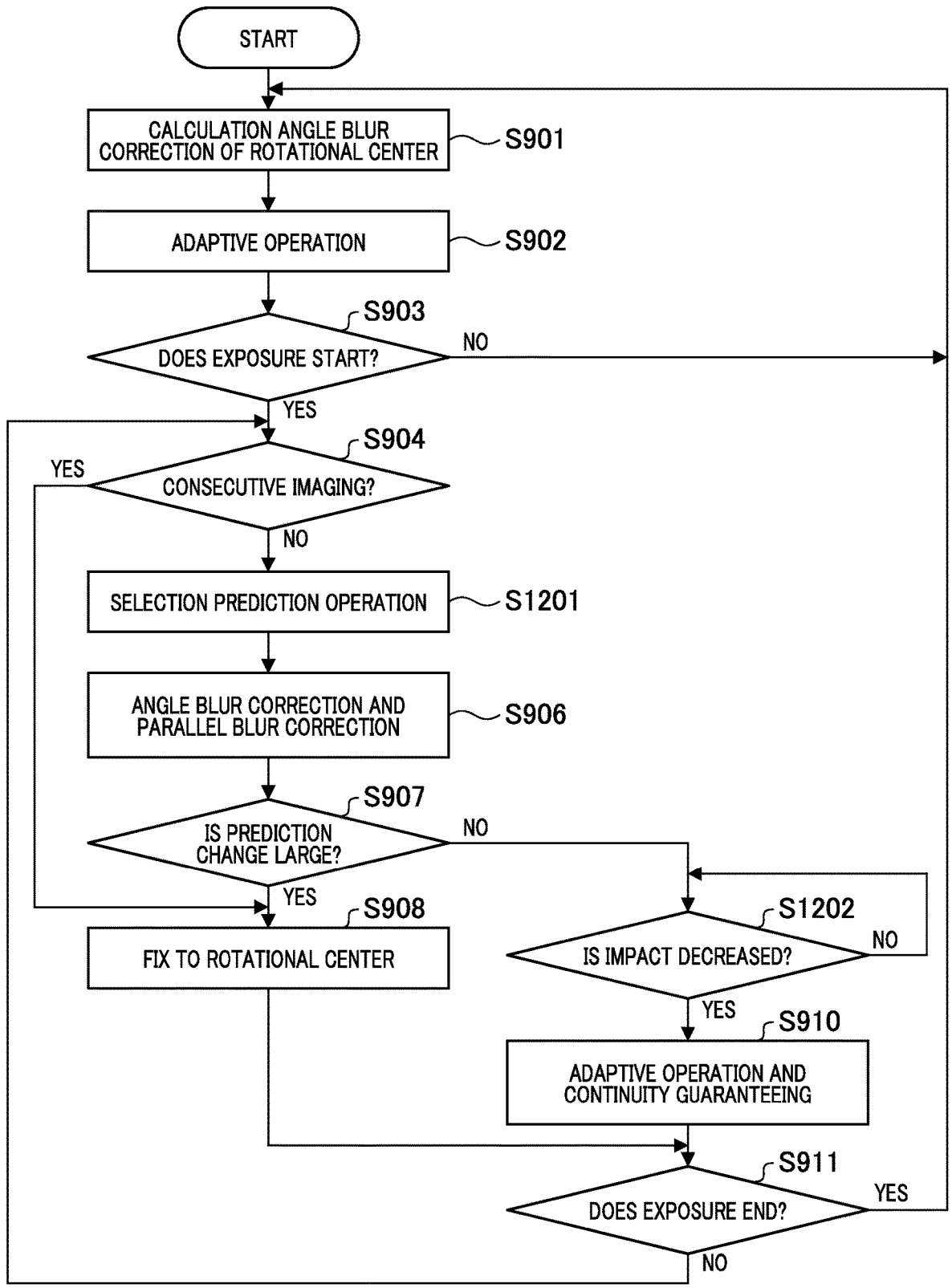
FIG. 14 is a flowchart illustrating image stabilization control of the camera according to the second embodiment of the present invention.

FIG. 14 is a flowchart illustrating image stabilization control of the camera according to the second embodiment. Since steps with the same reference numerals as those of the flowchart of FIG. 11 are similar processes, description thereof will be omitted. The CPU 12 serving as a computer executes a computer program stored in a memory to perform an operation of each step of the flowchart of FIG. 14.

In step S1201, the rotation radius selection unit 12xj selects one of a predicted optical system rotation radius from the first gain rotation radius prediction unit 12xg1 and a predicted rotation radius from the second gain rotation radius prediction unit 12xg2 based on an output of the signal determination unit 12xk. One of a predicted optical system rotation radius from the first gain rotation radius prediction unit 12yg1 and a predicted rotation radius from the second gain rotation radius prediction unit 12yg2 is selected based on the output of the signal determination unit 12xk.

In step S1202, the first and second accelerometers 16ya and 16xa detect disturbance vibration applied to the camera. Until the disturbance vibration dies down, this step is circulated and awaited to continue the prediction operation.

Third Embodiment

Figure 15:
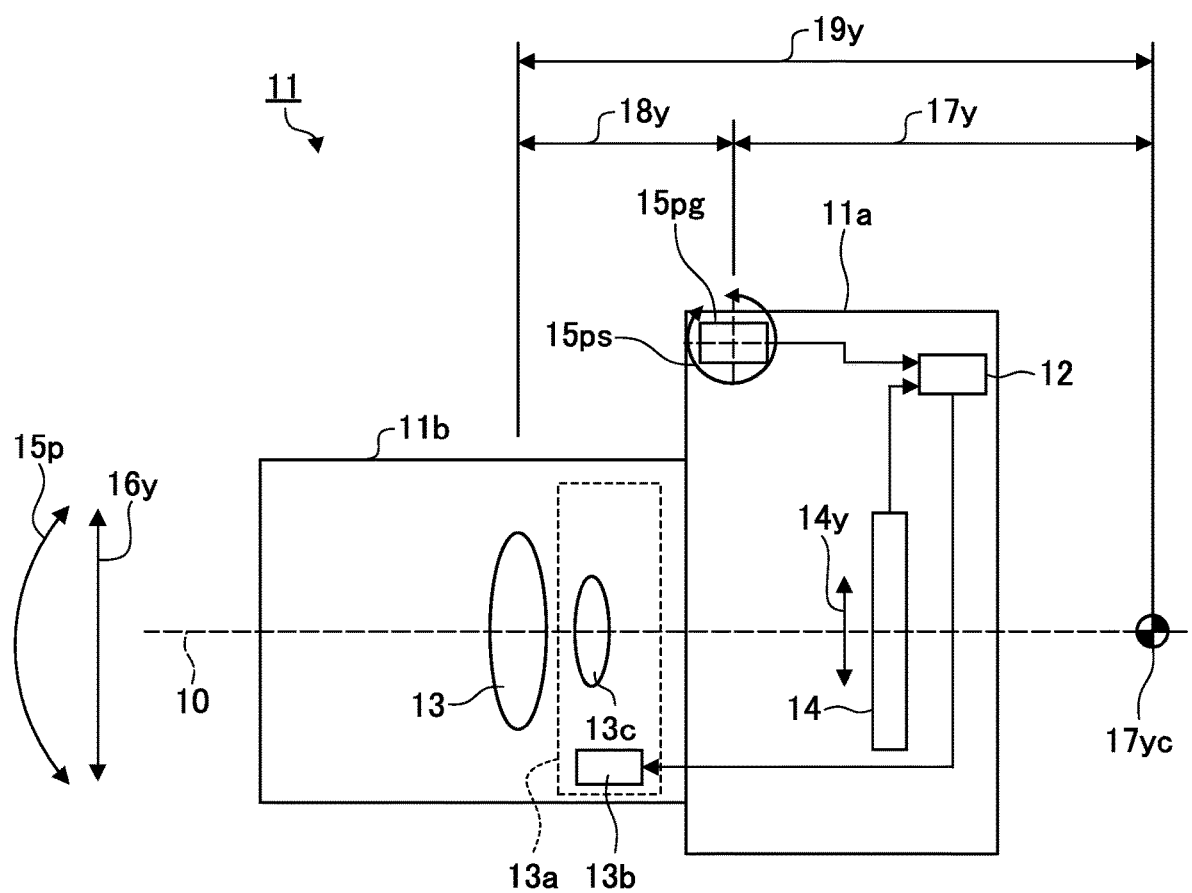
FIG. 15 is a side view illustrating a camera according to a third embodiment of the present invention.

A configuration of a camera according to a third embodiment will be described with reference to FIGS. 15 to 19. FIG. 15 is a side view illustrating a camera according to a third embodiment of the present invention. A difference from FIG. 1 is that a motion vector 14y in the direction of the arrow 14y detected from the image sensor 14 instead of the first accelerometer 16ya is input to the CPU 12. Although not illustrated, in the present embodiment, a motion vector detection unit that detects a motion vector of an image acquired from the image sensor 14 is included. The motion vector detection unit functions as a parallel blur detection unit.

Figure 16:
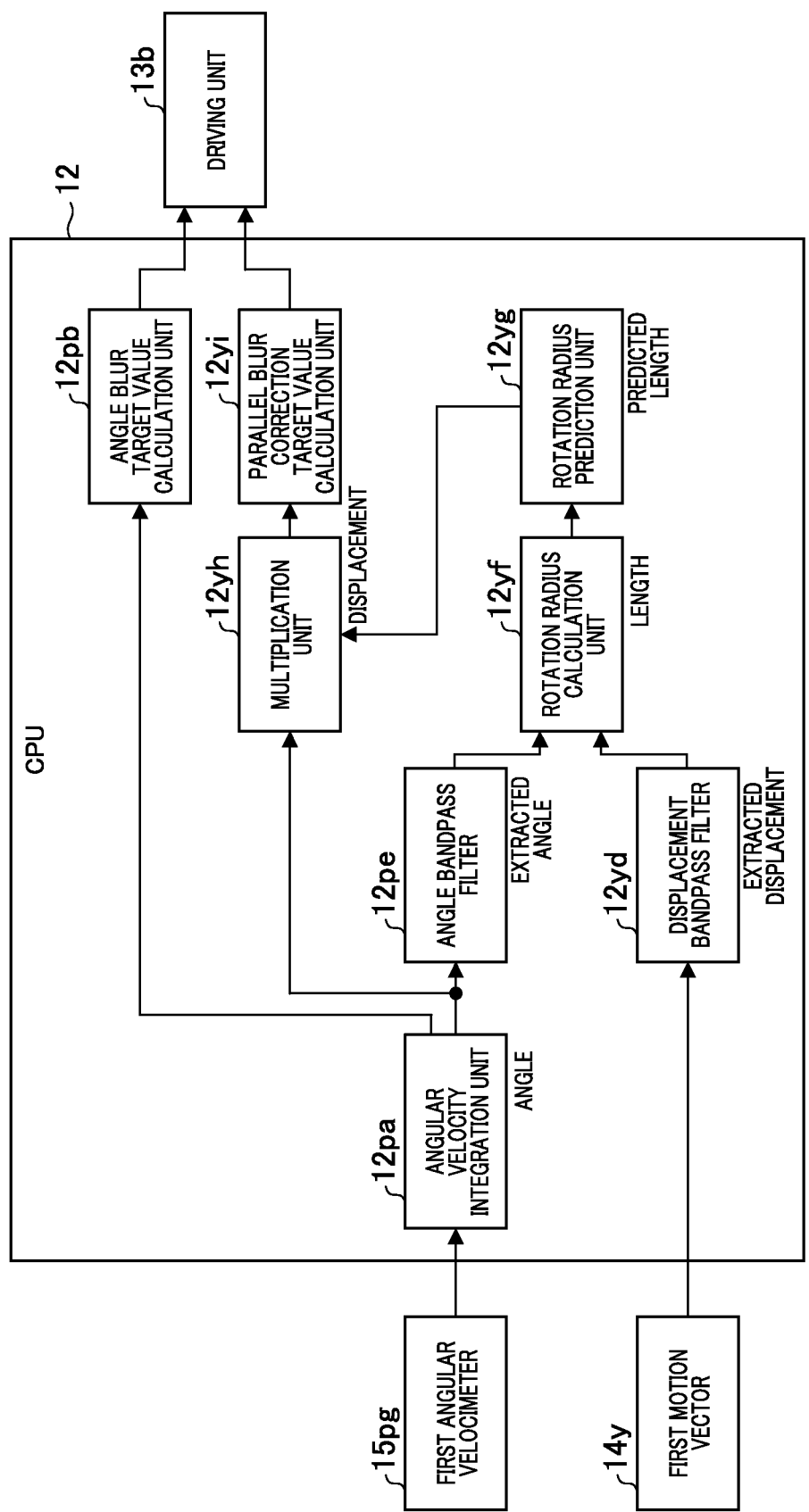
FIG. 16 is a functional block diagram illustrating main units of an image stabilization control device in a longitudinal direction of the camera in FIG. 15.

FIG. 16 is a functional block diagram illustrating main units of an image stabilization control device in a longitudinal direction of the camera in FIG. 15. A difference from FIG. 2 is that a displacement acquired from the motion vector 14y is input to the displacement bandpass filter 12yd.

Figure 17:
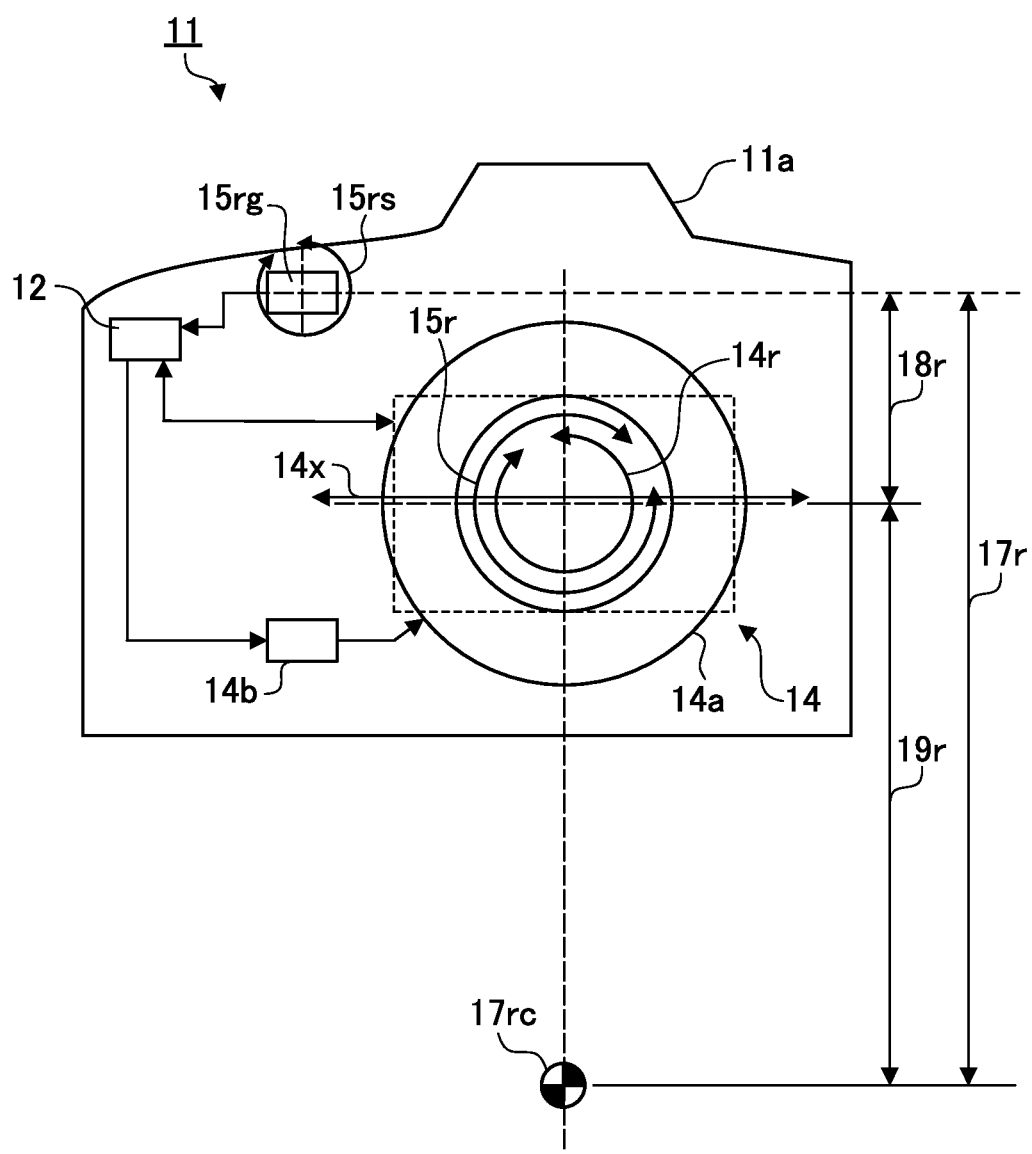
FIG. 17 is a front view illustrating the camera according to the third embodiment of the present invention.

FIG. 17 is a front view illustrating the camera according to the third embodiment. A difference from FIG. 5 is that a second motion vector 14x in the direction of the arrow 14x detected from the image sensor 14 is input to the CPU 12 instead of using the second accelerometer 16xa.

Figure 18:
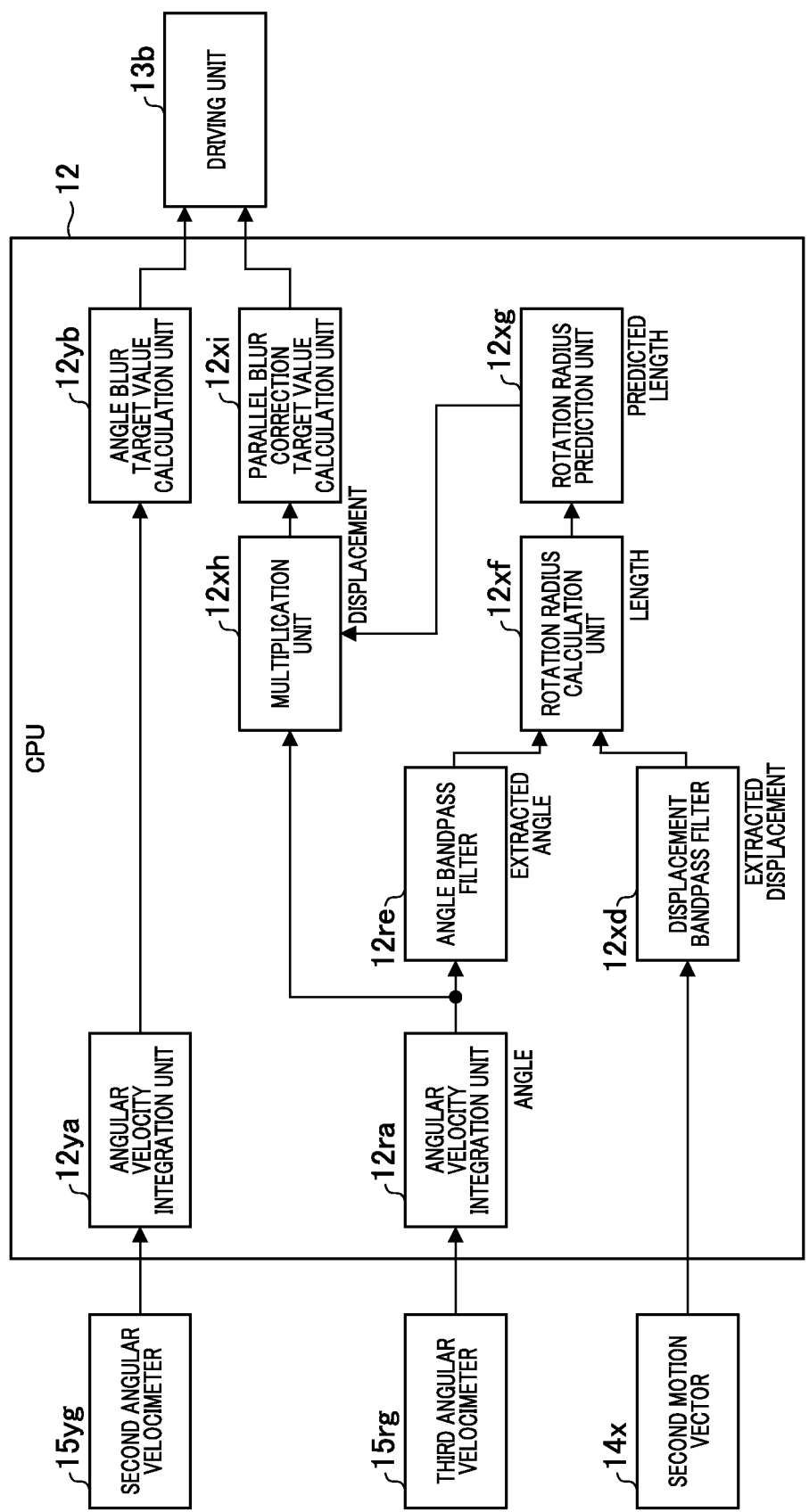
FIG. 18 is a functional block diagram illustrating the main units of the image stabilization control device in an optical axis direction of the camera in FIG. 17.

FIG. 18 is a functional block diagram illustrating the main units of the image stabilization control device in an optical axis direction of the camera in FIG. 17.

A difference from FIG. 4 is that a displacement achieved from the second motion vector 14x in the x direction is input to the displacement bandpass filter 12xd in FIG. 17. As in the second embodiment, the rotation radius calculation unit 12xf obtains the optical system rotation radius 19r using the third angular velocimeter 15rg.

In this way, an accelerometer is not used as the parallel blur detection unit and an optical system rotation radius is obtained from a ratio between a motion vector obtained from the image sensor 14 and an integration value of an angular velocity obtained from an angular velocimeter which is an angle detection unit. The rotation radius prediction unit outputs a rotation radius before exposure in the adaptive operation and outputs a predicted rotation radius in the prediction operation at the time of exposure to correct a parallel blur.

Further, in the third embodiment, a reliability determination unit that determines reliability of a predicted rotation radius is included. The blur correction control unit changes the predicted rotation radius of the rotation radius prediction unit based on determination of the reliability determination unit.

Figure 19:
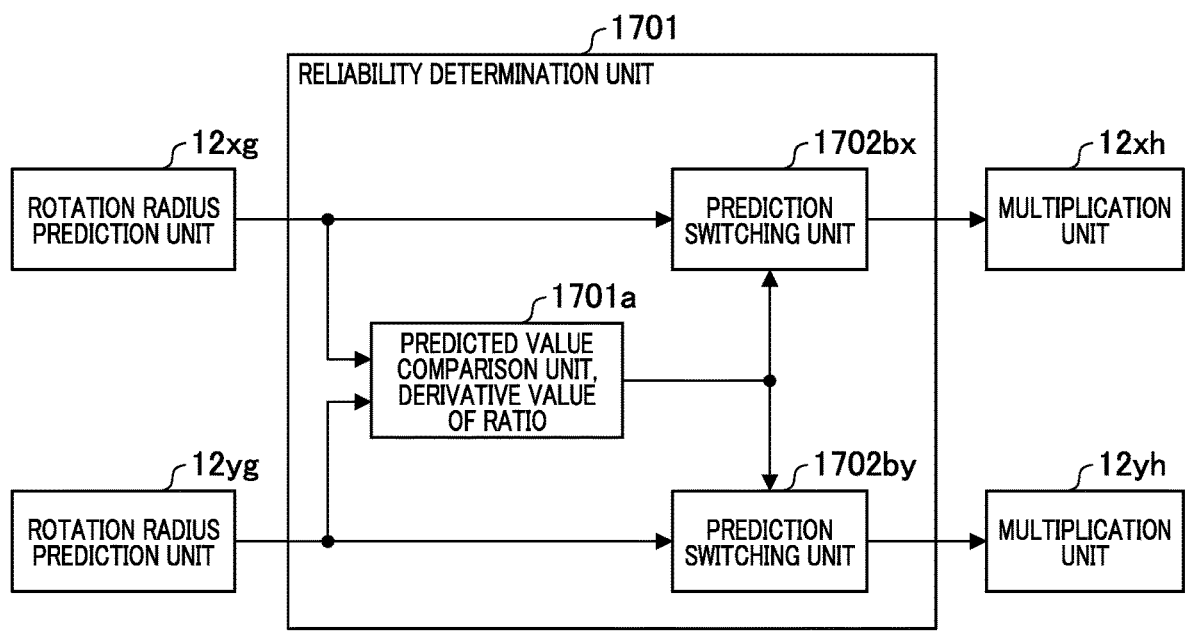
FIG. 19 is a functional block diagram illustrating a reliability determination unit according to the third embodiment.

FIG. 19 is a functional block diagram illustrating a reliability determination unit according to the third embodiment. In FIG. 19, a reliability determination unit 1701 determines reliability of a predicted rotation radius of the rotation radius prediction unit 12xg or 12yg based on comparison of predicted rotational radii of blurs in a plurality of different directions.

In the reliability determination unit 1701, signals of the rotation radius prediction units 12xg and 12yg are input to a predicted value comparison unit 1701a. The predicted value comparison unit 1701a calculates a ratio between optical system rotation radii inch are predicted values of the rotation radius prediction units 12xg and 12yg.

When a change in the ratio increases (when a derivative value of the ratio is greater than a predetermined threshold), it is determined that the reliability is lowered and set predicted value fixed signals are supplied to prediction switching units 1702bx and 1702by. That is, the reliability determination unit determines the reliability of the predicted rotation radius based on the change in the predicted rotation radii of the rotation radius prediction units.

The prediction switching units 1702bx and 1702by supply output signals from the rotation radius calculation units to the multiplication units 12xh and 12yh when the rotation radius prediction units 12xg and 12yg do not output predicted values (when the adaptive operation is performed).

When the rotation radius prediction units 12xg and 12yg output the predicted values (when the prediction operation is performed) and a predicted value fixed value is not supplied from the predicted value comparison unit 1701a, predicted values from the rotation radius prediction units 12xg and 12yg are output to the multiplication units 12xh and 12yh.

Conversely, when the rotation radius prediction units 12xg and 12yg output the predicted values (when the prediction operation is performed) and a predicted value fixed signal is output from the predicted value comparison unit 1701a, a predicted rotation radius at that time point is output as a fixed value to the multiplication units 12xh and 12yh. That is, the blur correction control unit fixes the predicted rotation radius of the rotation radius prediction unit to a predetermined value based on the reliability of the predicted rotation radius of the rotation radius prediction unit.

In this way, the reliability determination unit 1701 determines the reliability of the optical system rotation radius predicted based on the change in the ratio between two optical system rotation radii 19x and 19y. When a change in the rotation radius occurs, the change is substantially the same in any direction, and therefore a rotation radius with a small change in the ratio is used.

In FIG. 19, the reliability is determined based on the optical system rotation radii 19x and 19y, but the reliability may be determined based on comparison between the optical system rotation radii 19x and 19r or comparison between the optical system rotation radii 19y and 19r. Alternatively, when a change ratio of each of the optical system rotation radii 19x, 19y, and 19r exceeds a predetermined threshold, it may be determined that the reliability is low and the change ratio may be switched to a fixed value.

In each unit according to the foregoing embodiments may include a discrete electronic circuit, or some or all of the units may be configured with a processor such as an FPGA or a CPU or a computer program.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the image stabilization control device or the like through a network or various storage media. Then, a computer (or a CPU, an MPU, or the like) of the image stabilization control device or the like may be configured to read and execute the program. In such a case, the program and the storage medium storing the program configure the present invention.

This application claims the benefit of Japanese Patent Application No. 2021-133021 filed on Aug. 17, 2021, which is hereby incorporated by reference herein in its entirety.

What is claimed is:

1. An image stabilization control device including at least one processor or circuit configured to function as:
a rotation radius calculation unit configured to calculate a rotation radius of an angle blur based on outputs of an angle blur signal acquired from an angle blur detection unit and a parallel blur signal acquired from a parallel blur detection unit;
a rotation radius prediction unit configured to predict a change in the rotation radius based on an output of the rotation radius calculation unit and output a rotation radius prediction signal; and
a blur correction control unit configured to control correction of the parallel blur based on the rotation radius prediction signal of the rotation radius prediction unit and the angle blur signal acquired from the angle blur detection unit.

2. The image stabilization control device according to claim 1, wherein the blur correction control unit corrects the parallel blur based on the rotation radius prediction signal and an output of the angle blur detection unit during a period in which disturbance vibration is equal to or greater than a predetermined value and corrects the parallel blur based on the output of the rotation radius calculation unit and the output of the angle blur detection unit during a period in which the disturbance vibration is less than the predetermined value.

3. The image stabilization control device according to claim 1, wherein the blur correction control unit operates to decrease a difference between the correction of the parallel blur which is based on the rotation radius prediction signal and the output of the angle blur detection unit and the correction of the parallel blur which is based on the output of the rotation radius calculation unit and the output of the angle blur detection unit.

4. The image stabilization control device according to claim 1, further comprising:
a plurality of bandpass filters configured to extract different frequency components respectively from the output of the angle blur detection unit and an output of the parallel blur detection unit;
a plurality of the rotation radius prediction units configured to predict the rotation radius of the angle blur based on signals of the plurality of bandpass filters; and
a rotation radius selection unit configured to select an output used to correct the parallel blur from outputs of the plurality of rotation radius prediction units.

5. The image stabilization control device according to claim 4, wherein output gains of the plurality of rotation radius prediction units are set to be different for each frequency.

6. The image stabilization control device according to claim 1, further comprising:
a reliability determination unit configured to determine reliability of the rotation radius predicted by the rotation radius prediction unit,
wherein the blur correction control unit changes a predicted rotation radius of the rotation radius prediction unit based on the determination of the reliability determination unit.

7. The image stabilization control device according to claim 6, wherein the reliability determination unit determines reliability of the predicted rotation radius based on the change in the predicted rotation radius of the rotation radius prediction unit.

8. The image stabilization control device according to claim 6, wherein the blur correction control unit fixes the predicted rotation radius of the rotation radius prediction unit to a predetermined value based on reliability of the predicted rotation radius of the rotation radius prediction unit.

9. The image stabilization control device according to claim 1, wherein the parallel blur detection unit includes an accelerometer and the rotation radius calculation unit acquires a signal from the accelerometer as the parallel blur signal.

10. The image stabilization control device according to claim 1, wherein the parallel blur detection unit includes a motion vector detection unit that detects a motion vector of an image sensor and the rotation radius calculation unit acquires a signal from the motion vector detection unit as the parallel blur signal.

11. The image stabilization control device according to claim 1, wherein the angle blur detection unit includes an angular velocimeter and the rotation radius calculation unit acquires a signal from the angular velocimeter as the angle blur signal.

12. The image stabilization control device according to claim 2, further comprising a determination unit configured to determine whether the period in which the disturbance vibration is equal to or greater than the predetermined value continues based on whether a predetermined time passes.

13. The image stabilization control device according to claim 1, wherein the blur correction control unit controls a driving unit that drives an imaging optical system.

14. The image stabilization control device according to claim 1, wherein the blur correction control unit controls a reading region changing unit that changes a reading region of an image obtained by an imaging unit.

15. The image stabilization control device according to claim 1, wherein the angle blur detection unit includes a plurality of angle blur detection sensors that detect the angle blur with respect to angles in a plurality of directions and the rotation radius calculation unit acquires, as the angle blur signal, the angle blur signals for the angles in the plurality of directions from the plurality of angle blur detection sensors.

16. The image stabilization control device according to claim 1, wherein the parallel blur detection unit includes a plurality of parallel blur detection sensors that detect the parallel blur in a plurality of directions and the rotation radius calculation unit acquires, as the parallel blur signal, the parallel blur signals in the plurality of directions from the plurality of parallel blur detection sensors.

17. A non-transitory computer-readable storage medium configured to store a computer program to control an image stabilization control device, wherein the computer program comprises instructions for executing following processes of:
calculating a rotation radius of an angle blur based on outputs of an angle blur signal acquired from an angle blur detection unit and a parallel blur signal acquired from a parallel blur detection unit;
predicting a change in the rotation radius based on an output in the calculating of the rotation radius and outputting a rotation radius prediction signal; and
controlling correction of the parallel blur based on the rotation radius prediction signal in the predicting of the rotation radius and the angle blur signal acquired from the angle blur detection unit.

* * * * *